(12) United States Patent
Meenen et al.

(10) Patent No.: US 10,188,022 B2
(45) Date of Patent: Jan. 29, 2019

(54) ROTATING LIFT SYSTEM AND METHOD

(71) Applicant: Bestway, Inc., Hiawatha, KS (US)

(72) Inventors: Don Patrick Meenen, Hiawatha, KS (US); David C. Benson, Hiawatha, KS (US); Michael A. Brainard, Hiawatha, KS (US)

(73) Assignee: Bestway, Inc., Hiawatha, KS (US)

( * ) Notice: Subject to any disclaimer, the term of this patent is extended or adjusted under 35 U.S.C. 154(b) by 289 days.

(21) Appl. No.: 14/823,795

(22) Filed: Aug. 11, 2015

(65) Prior Publication Data

US 2015/0342111 A1  Dec. 3, 2015

Related U.S. Application Data

(63) Continuation-in-part of application No. 14/013,889, filed on Aug. 29, 2013, now Pat. No. 9,533,612, which is a continuation-in-part of application No. 13/018,077, filed on Jan. 31, 2011, now Pat. No. 8,534,982.

(51) Int. Cl.
*A01D 75/00* (2006.01)
*A01B 73/00* (2006.01)
*B60P 1/28* (2006.01)
*B60P 1/16* (2006.01)

(52) U.S. Cl.
CPC .......... *A01B 73/005* (2013.01); *A01D 75/002* (2013.01); *B60P 1/167* (2013.01); *B60P 1/28* (2013.01)

(58) Field of Classification Search
CPC ..... A01B 63/32; A01B 73/005; A01B 59/062; A01D 75/002; B60P 1/165; B60P 1/483

USPC ...... 172/272, 273, 439; 280/416.2; 414/546, 414/547, 550, 556, 687, 692, 703, 723, 414/742

See application file for complete search history.

(56) References Cited

U.S. PATENT DOCUMENTS

| | | |
|---|---|---|
| 3,488,077 A | 1/1970 | Miller |
| 3,588,160 A | 6/1971 | Reiner |
| 3,608,943 A | 9/1971 | Gostomski |
| 3,727,698 A | 4/1973 | Van Selus |
| 3,838,868 A | 10/1974 | Robertson |
| 3,904,054 A * | 9/1975 | van der Lely .......... B60P 1/483 280/764.1 |
| 3,977,691 A | 8/1976 | Robertson |
| 4,060,259 A | 11/1977 | Mefferd et al. |

(Continued)

OTHER PUBLICATIONS

"Retriever Self Loading Trailer", Retriever Self Loading Trailer Operators Manual Mar./Apr. 2010, Mar. 1, 2010, 1-24.

*Primary Examiner* — Saul Rodriguez
*Assistant Examiner* — Brendan P Tighe
(74) *Attorney, Agent, or Firm* — Law Office of Mark Brown, LLC; Mark E. Brown; Christopher M. DeBacker

(57) ABSTRACT

A lift system and method for transporting agricultural implements. The lift system includes a pair of lower linkage arms, an upper link, and at least four carriage wheels for transporting the lift system along carriage guide rails of a trailer frame. A load lift assembly is mounted on the trailer and is movable between lowered, loading position, a raised position, and a transport position. It is capable of connecting to a load having a three-point hitch. A gas strut may optionally be equipped to aid in the lifting process. A telescoping light bar may be included to increase safety while in transport.

4 Claims, 34 Drawing Sheets

(56) References Cited

U.S. PATENT DOCUMENTS

| | | | |
|---|---|---|---|
| 4,286,918 A * | 9/1981 | Shannon | B60P 3/00 172/443 |
| 4,382,631 A * | 5/1983 | Johnson | A01D 90/105 280/764.1 |
| 4,850,789 A | 7/1989 | Zimmerman | |
| 4,969,533 A | 11/1990 | Holm et al. | |
| 5,026,247 A | 6/1991 | Zimmerman | |
| 5,380,209 A | 1/1995 | Converse, Jr. et al. | |
| 5,538,088 A | 7/1996 | Wait | |
| 5,540,049 A * | 7/1996 | Lunzman | E02F 9/2203 60/327 |
| 6,059,330 A | 5/2000 | Moffett et al. | |
| 6,238,170 B1 | 5/2001 | Pingry et al. | |
| 7,325,880 B2 | 2/2008 | Gapski | |
| 2012/0195725 A1* | 8/2012 | Meenen | A01D 75/002 414/546 |
| 2014/0003898 A1* | 1/2014 | Meenen | B60P 1/00 414/550 |
| 2015/0342111 A1* | 12/2015 | Meenen | A01B 73/005 414/550 |

* cited by examiner

FIG. 7A (Load Lift Assbly Lowered)

FIG. 7B (Load Lift Assbly Raised)

(Load Lift Assbly
Raised with 3-Point Hitch Implement)

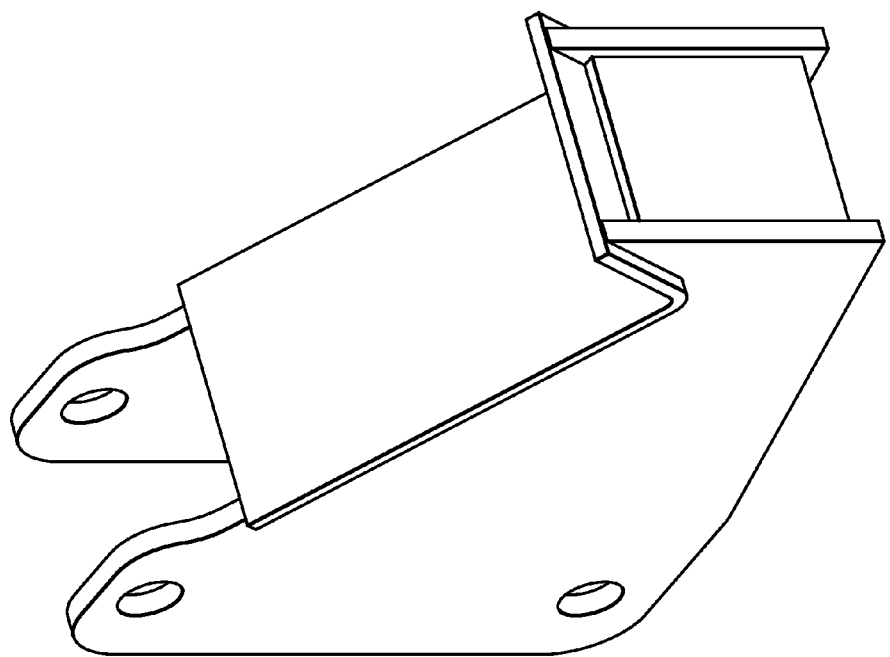
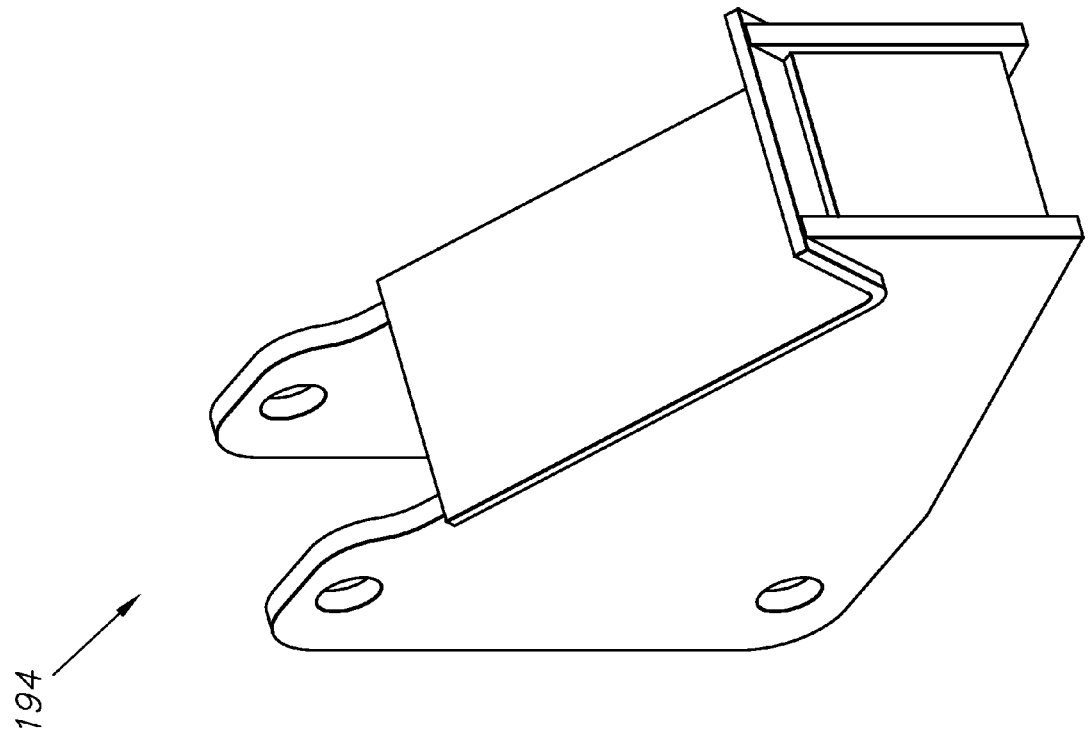
FIG. 16

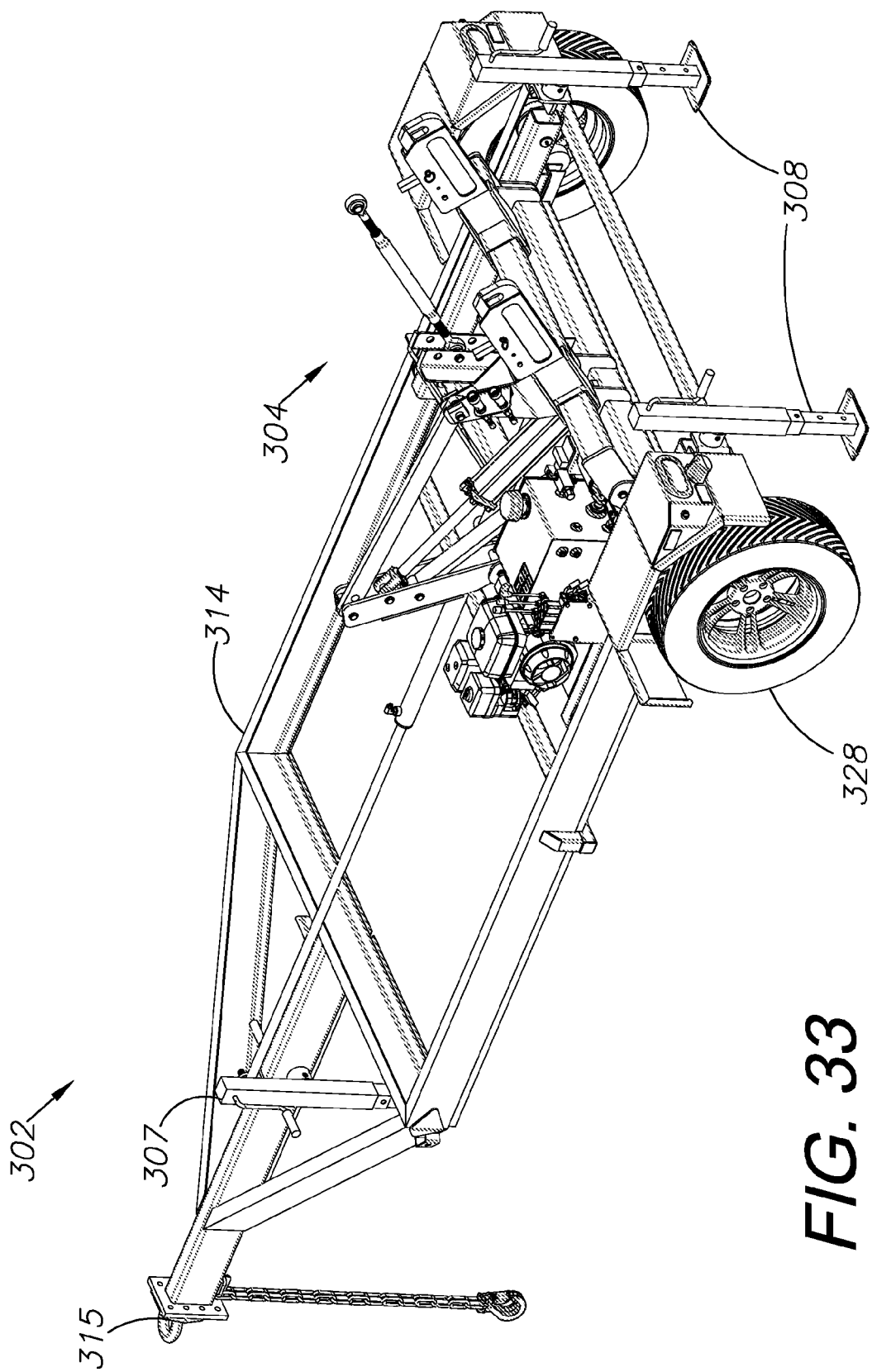

ROTATING LIFT SYSTEM AND METHOD

CROSS-REFERENCE TO RELATED APPLICATIONS

This application is a continuation-in-part of and claims the benefit of U.S. patent application Ser. No. 14/013,889, filed Aug. 29, 2013, which is a continuation-in-part of and claims the benefit of U.S. patent application Ser. No. 13/018, 077, filed Jan. 31, 2011, now U.S. Pat. No. 8,534,982, all of which are incorporated herein by reference.

BACKGROUND OF THE INVENTION

1. Field of the Invention

The present invention relates generally to a loading system for a vehicle, and particularly to a rotating lift system for loading and unloading equipment, such as combine heads and other agricultural implements, on trailers.

2. Description of the Related Art

Implements and equipment for tillage, cultivation and other agricultural operations have been developed with the objectives of increasing efficiency and lowering operating costs. For example, wider equipment tends to be more efficient because greater field areas can be covered with fewer passes in less time. Tractors have tended to become larger in order to accommodate such wider implements and their greater towing power requirements.

Modern agricultural operations commonly require equipment adapted for transporting over public roads. For example, many farmers and farming operations work multiple, noncontiguous fields with the same equipment, which must be configured to comply with traffic regulations, including maximum width requirements. Various implement transport mechanisms have been developed for this purpose. For example, implements are commonly designed to fold and unfold between field use and transport configurations.

Transporting oversize implements commonly involves placing them on transport vehicles, such as trailers, with their long dimensions generally aligned with the direction of travel. For example, the Mefferd et al. U.S. Pat. No. 4,060, 259 shows an implement supported on auxiliary wheels and drawn by a vehicle attached to an end of the implement. Alternatively, an implement can be reoriented by a device that rotates it. For example, the Van Selus U.S. Pat. No. 3,727,698 discloses a trailer apparatus incorporating a turntable supported on a trailer body wherein a lift and support assembly is mounted on the turntable for lifting an implement and supporting it in an elevated position with the elongated dimension of the implement extending parallel to the direction of travel.

A further example is shown in the Shannon U.S. Pat. No. 4,286,918, which discloses an implement transporter including a trailer having a lifting and rotating mechanism for engaging, lifting and rotating an implement. The weight of the implement is supported by a roller, and the lifting mechanism is guided through an arcuate path-of-movement by an arm pivoted adjacent to one side of the trailer whereby the supported implement may be rotated 90 degrees relative to the trailer.

Yet another example is shown in the Pingry et al. U.S. Pat. No. 6,238,170, which describes an implement transporter including a trailer having a lifting and rotating mechanism for engaging, lifting and rotating the implement. The trailer includes a turntable supporting a cantilevered arm and the cantilevered arm includes a lift and support assembly.

Existing pieces of equipment for hauling large implements or other objects may be oversized for some situations or for some users' needs. The prior art references above, for example, would be more equipment than necessary for many smaller applications.

Heretofore there has not been available a lift mechanism with the advantages and features of the present invention.

SUMMARY OF THE INVENTION

In the practice of an aspect of the present invention a rotator arm, a rotator arm guide, an arcuate rotation track and a load lift assembly are provided for engaging, lifting and rotating an implement, thereby moving the implement between perpendicularly opposed field use and transport positions. The rotator arm is connected to a pivot member for rotation about a vertical axis. The rotator arm guide is connected to the opposite end of the rotator arm. The rotator arm guide is adapted for engaging and moving along the rotation track. The load lift assembly is mounted on the rotator arm and is adapted for engaging an implement's three point hitch or header attachment and lifting the implement or header.

An alternative embodiment lifting system is connected to a standard hitch trailer along a pair of carriage rails. The lifting system is pushed forwards and backwards on the trailer by a hydraulic piston-and-cylinder, from a transport position to a loading position. A second hydraulic piston-and-cylinder raises and lowers a linkage assembly for connecting with a three-point hitch of an implement or load. The load is then raised and pulled back onto the trailer such that it is placed over the axle and wheels of the trailer.

BRIEF DESCRIPTION OF THE DRAWINGS

The drawings constitute a part of this specification and include exemplary embodiments of the present invention illustrating various objects and features thereof.

FIG. 16 is an enlarged, isometric view, particularly showing modified header adapter brackets.

FIG. 33 is a three-dimensional isometric view of the embodiment shown in FIG. 25, having a pair of outriggers mounted to the rear of the trailer frame.

DETAILED DESCRIPTION OF THE PREFERRED EMBODIMENTS

I. Introduction and Environment

Figure 1:
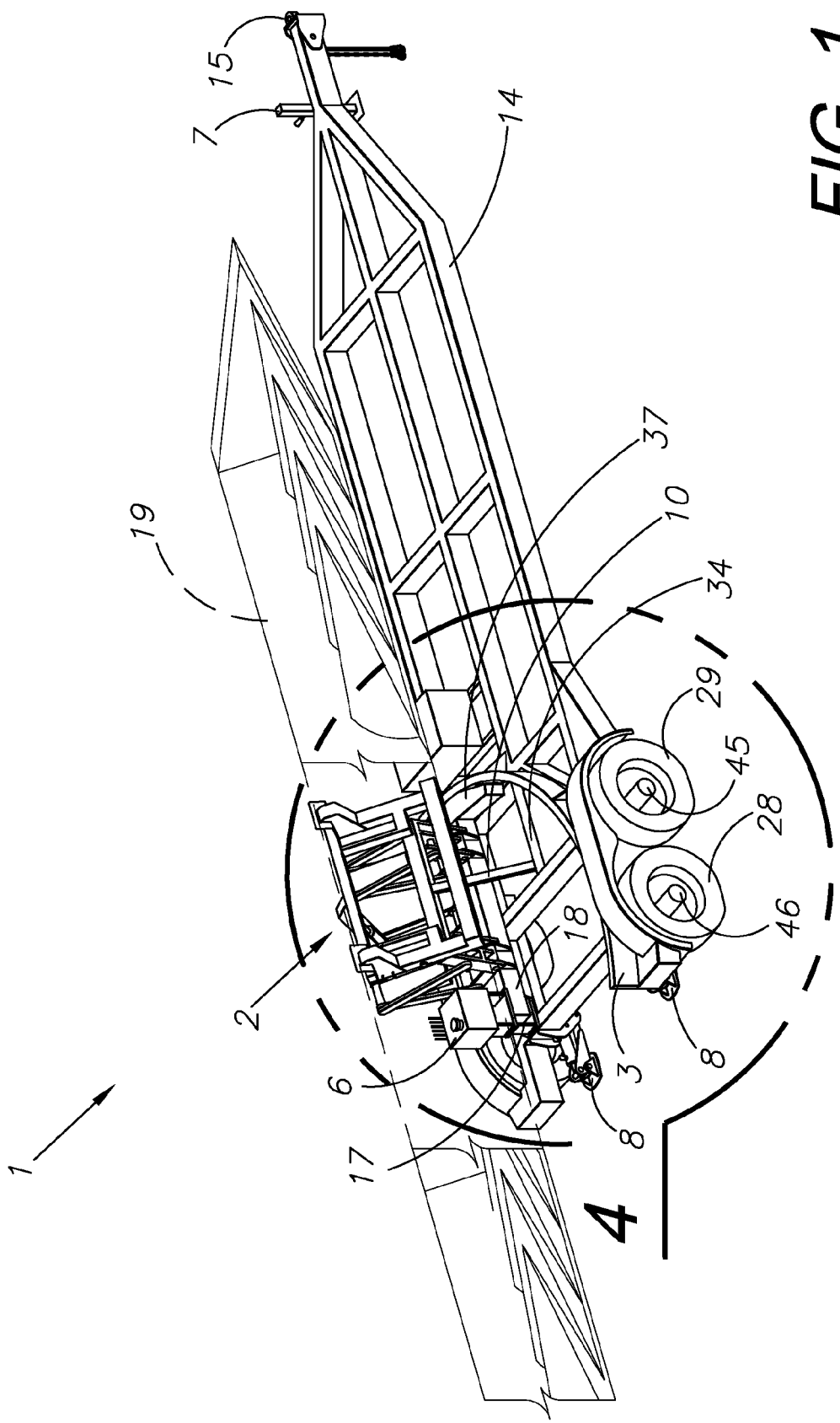
FIG. 1 is an isometric view of a rotating lift system embodying an aspect of the present invention.
Figure 2:
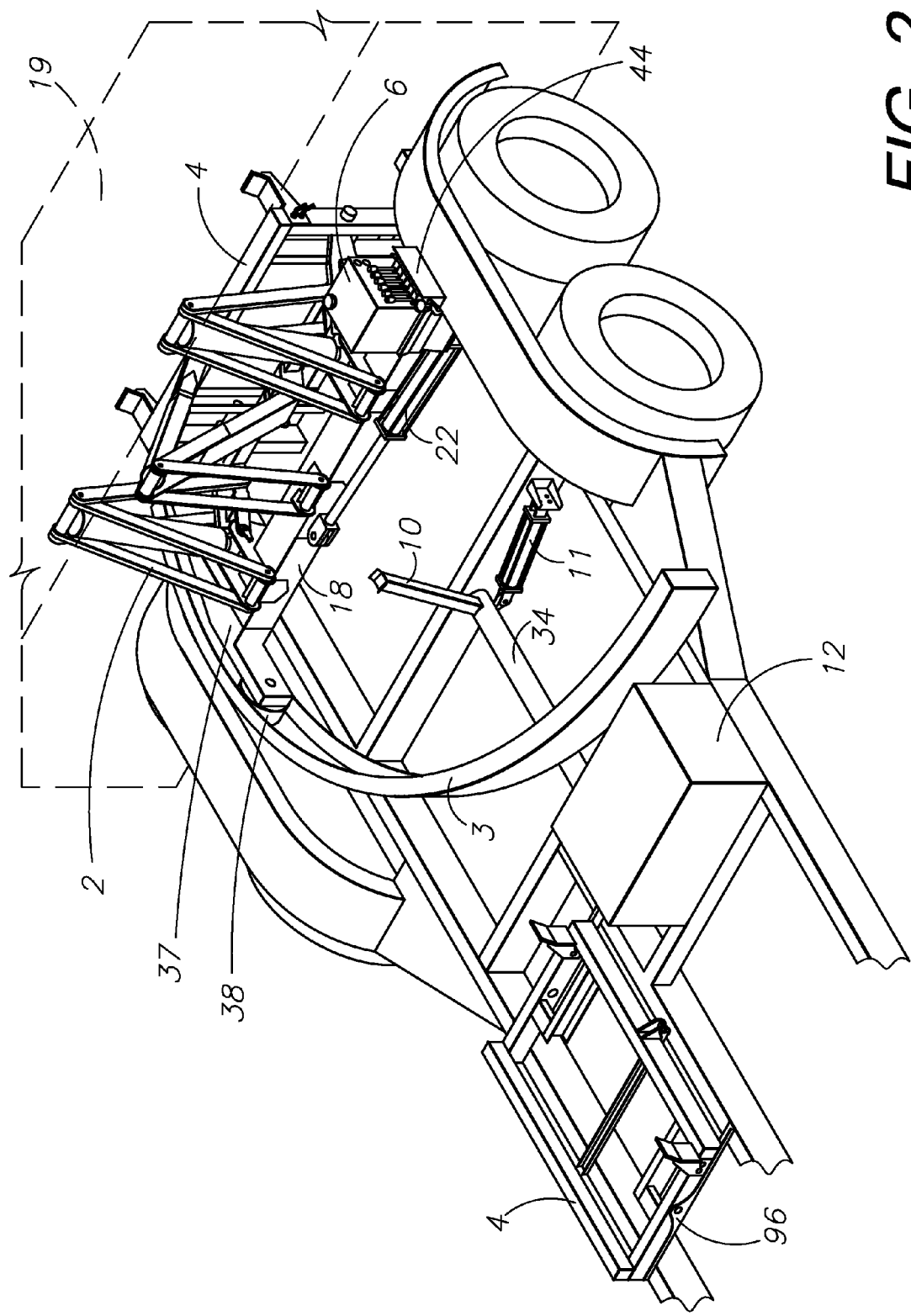
FIG. 2 is an isometric view of the rotating lift system with the load lift assembly in a lowered, loading position.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment or Aspect of the Self Loading Trailer

Referring to the drawings in more detail; the reference numeral 1 generally designates a rotating lift system embodying the present invention, as shown in FIGS. 1-17. Without limitation on the range of useful applications of the rotating lift system 1, an exemplary application is disclosed comprising: a trailer frame 14 including a rear set of wheels 28 mounted on a rear axle 45 and a forward set of wheels 29 mounted on a forward axle 45, the axles 45 and 46 being mounted on the trailer frame 14; a pair of stabilizers 8 mounted on the rear of the trailer frame 14; and a jack 7 mounted on the front of the trailer frame 14. The trailer frame 14 supports a rotator arm 18, a rotator arm guide 37, a pin assembly 17, an engine 13, an engine enclosure 12 and a rotation track 3.

The pin assembly 17 is mounted on a side of the trailer frame 14 and includes a pin assembly housing 16, a rotator arm pin 24 and a rotation cylinder pin 25. The rotator arm 18, having a first end 35 and a second end 36, is rotatably connected on its first end 35 to the pin assembly 17 at the rotator arm pin 24 and is rotatable about a vertical axis between a first, load position shown in FIGS. 2 and 3 and a second, transport position shown in FIG. 4. The second end 36 of the rotator arm 18 is attached to rotator arm guide 37. The rotator arm guide 37 engages the rotation track 3 with guide wheels 38. The rotation track 3 is mounted on the trailer frame 14 and is arcuately shaped and concentric with the vertical axis of rotation of the rotator arm 18.

A rotation cylinder 22 connects to the pin assembly 17 at a rotation cylinder pin 25 and connects to the rotator arm 18 at a cylinder arm connection pin 23. The rotation cylinder 22 actuates the movement of the rotator arm 18 between its first and second positions. A load lift assembly 2 is mounted on the rotator arm 18 with a pair of lift arm attachment brackets 30 and a top link attachment bracket 31. The load lift assembly 2 comprises a pair of lower linkage subassemblies 50, a lift arm crossbar 58 and an upper linkage subassembly 70.

Referring to FIGS. 7A and 7B, the lower linkage subassemblies 50 are each attached to the rotator arm 18 by a pair of lift arm attachment brackets 30. Each lower linkage subassembly 50 comprises the pair of lift arm attachment brackets 30, a pair of forward lower link members 54, a lower linkage pin 53, a lift cylinder pin 57, a pair of rearward lower link members 55, a lower lift arm linkage pin 59, a pair of lower lift arm linkage members 56, a lift arm pin 52, a lift arm 51, a lower connector 60 and a lift cylinder 20. For each lower linkage subassembly 50, the forward lower link members 54 are each movably connected on one end to the lift arm attachment brackets 30 by the lower linkage pin 53 and are attached on their respective opposite ends to the rearward lower link members 55 by the lift cylinder pin 57, the rearward lower link members 55 each being attached on their respective opposite ends to the lower lift arm link members 56 by the lower lift arm linkage pin 59. For each lower linkage subassembly 50, the lower lift arm link members 56 are each attached on one end to the lift arm attachment brackets 30 by the lift arm pin 52. For each lower linkage subassembly 50, the lower lift arm 51 is attached to the lower lift arm link members 56 and the lower connector 60 is attached to the end of the lower lift arm 51. The lower connectors 60 are adapted for connecting to a three-point hitch. The lower linkage subassemblies 50 are connected by the lift arm crossbar 58, which is attached on either end to the lower lift arms 51. For each lower linkage subassembly 50, the lift cylinder 20 is attached on one end to the lift arm pin 52 and on the opposite end to the lift cylinder pin 57. The lift cylinders 20 actuate the lifting movement of the load lift assembly 2 between its first, lowered position (FIG. 7A) and its second, raised position (FIG. 7B).

The upper linkage subassembly 70 is attached to the rotator arm 18 by a pair of top link attachment brackets 31. The upper linkage subassembly 70 comprises the pair of top link attachment brackets 31, a pair of forward upper link members 72, an upper linkage pin 71, a top link pin 73, an upper lift arm 74, a cross bar pin 75, a pair of upper third arm link members 76, an upper link slide arm tube 77, an upper link slide arm 78, an upper connector 79 and a top link cylinder 26. The forward upper link members 72 are each attached on one end to the top link attachment brackets 31 and are each attached on their respective opposite ends to the end of the upper lift arm 74 by the top link pin 73. The upper lift arm 74 is attached on its opposite end to the lift arm crossbar 58 by the crossbar pin 75. The upper third arm link members 76 are each attached on one end to the ends of the forward upper link members 72 and the end of the upper lift arm 74 by the top link pin 73. The pair of upper third arm link members 76 opposite ends are each attached to the top link slide arm tube 77. The top link slide arm 78, having a first end and a second end, is slidably seated inside the top link slide arm tube 77. The top link cylinder 26 is attached on one end to the top link pin 73 and is attached on its opposite end to the first end of the top link slide arm 78. The upper connector 79 is attached to the second end of the top link slide arm 78 and is adapted for connecting to a three point hitch. The top link cylinder 26 actuates the movement of the top link slide arm between its first, extended position and its second, retracted position.

Figure 8:
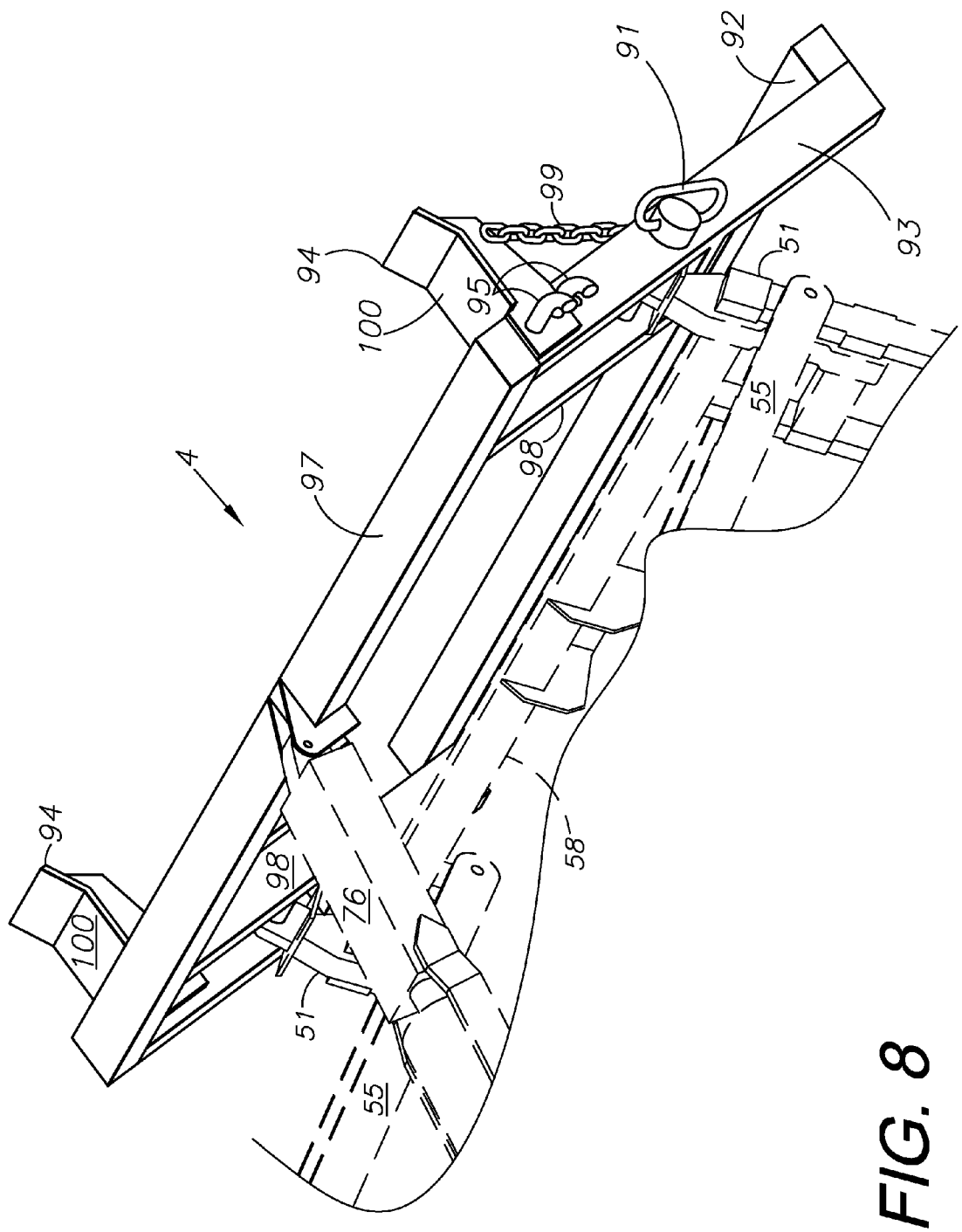
FIG. 8 is an enlarged, isometric view of the header adapter from FIG. 6, shown with three point hitch connectors of the load lift assembly attached thereto.
Figure 9:
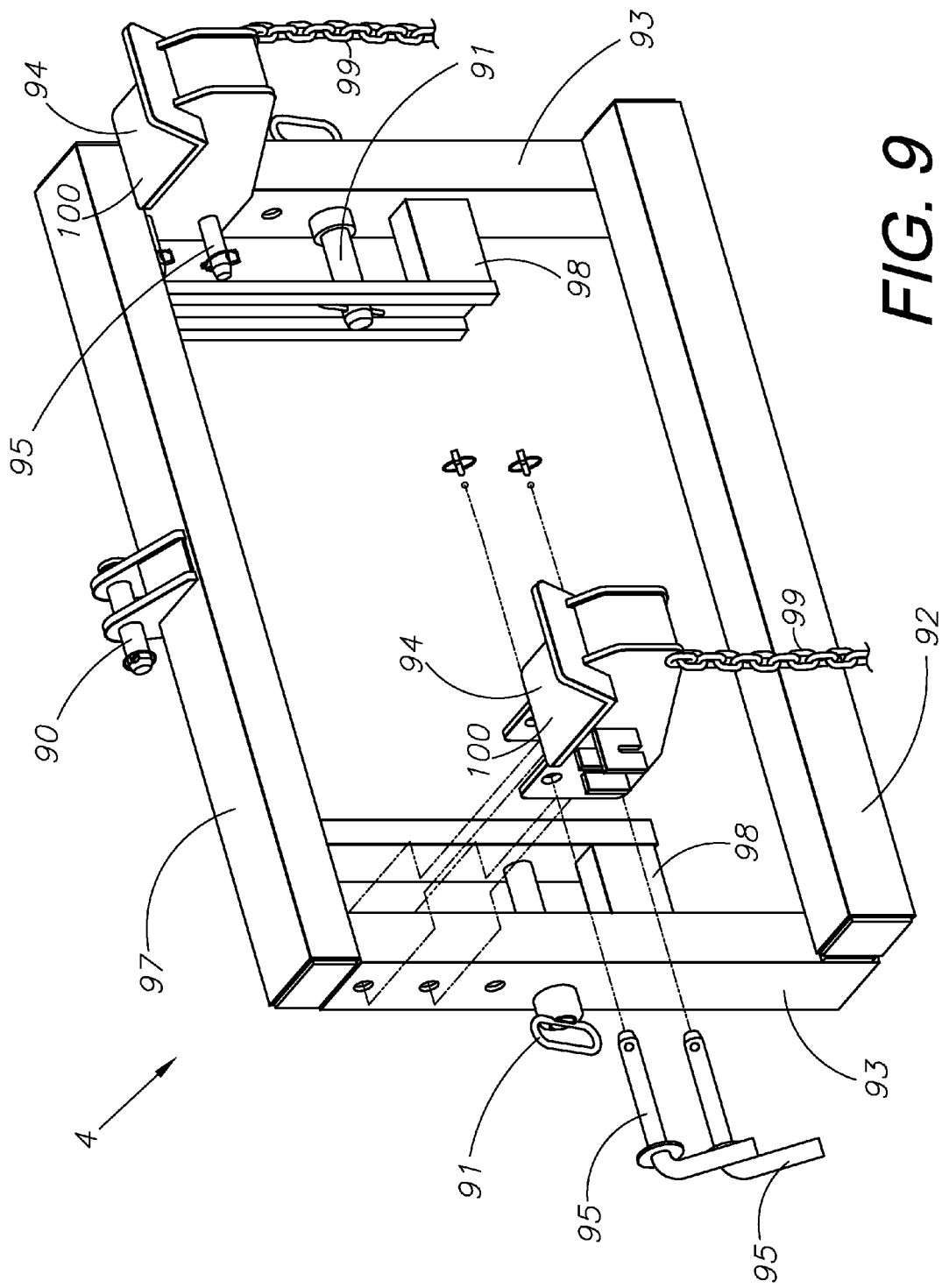
FIG. 9 is an isometric view of the header adapter showing the header adapter brackets and the three-point hitch connection pins.

Referring to FIGS. 8 and 9, a header adapter 4 comprising a head lift adapter 92 is attached at both of its ends to a pair of vertical header members 93; a horizontal header member 97 is attached on either of its ends to the opposite ends of the pair of vertical header members 93; a pair of head adapter brackets 94 are each attached to the vertical header members 93; multiple header adapter bracket pins 95 are adapted for connecting the header adapter brackets 94 to the vertical header members 93; a pair of lower header pins 91 and an upper header pin 90 are adapted for connecting the header adapter 4 to the load lift assembly 2 by the three point hitch connectors 60 and 79; and a pair of header elbows 98 are each attached to the horizontal header member 97 and to a respective vertical header member 93. The header adapter brackets 94 form hooks 100 receiving a header 19. The lower header pins 91 connect to the header adapter 4 and extend through the vertical header members 93 and the header elbows 98. A load, such as a combine header, can be placed on and transported by the rotating lift system 1 by mounting the header adapter 4 on the load lift assembly 2, as described above. Chains 99 are attached to each header adapter bracket 94 and are adapted for wrapping around part of a combine header and thereby securing it to the header adapter 4.

Figure 11:
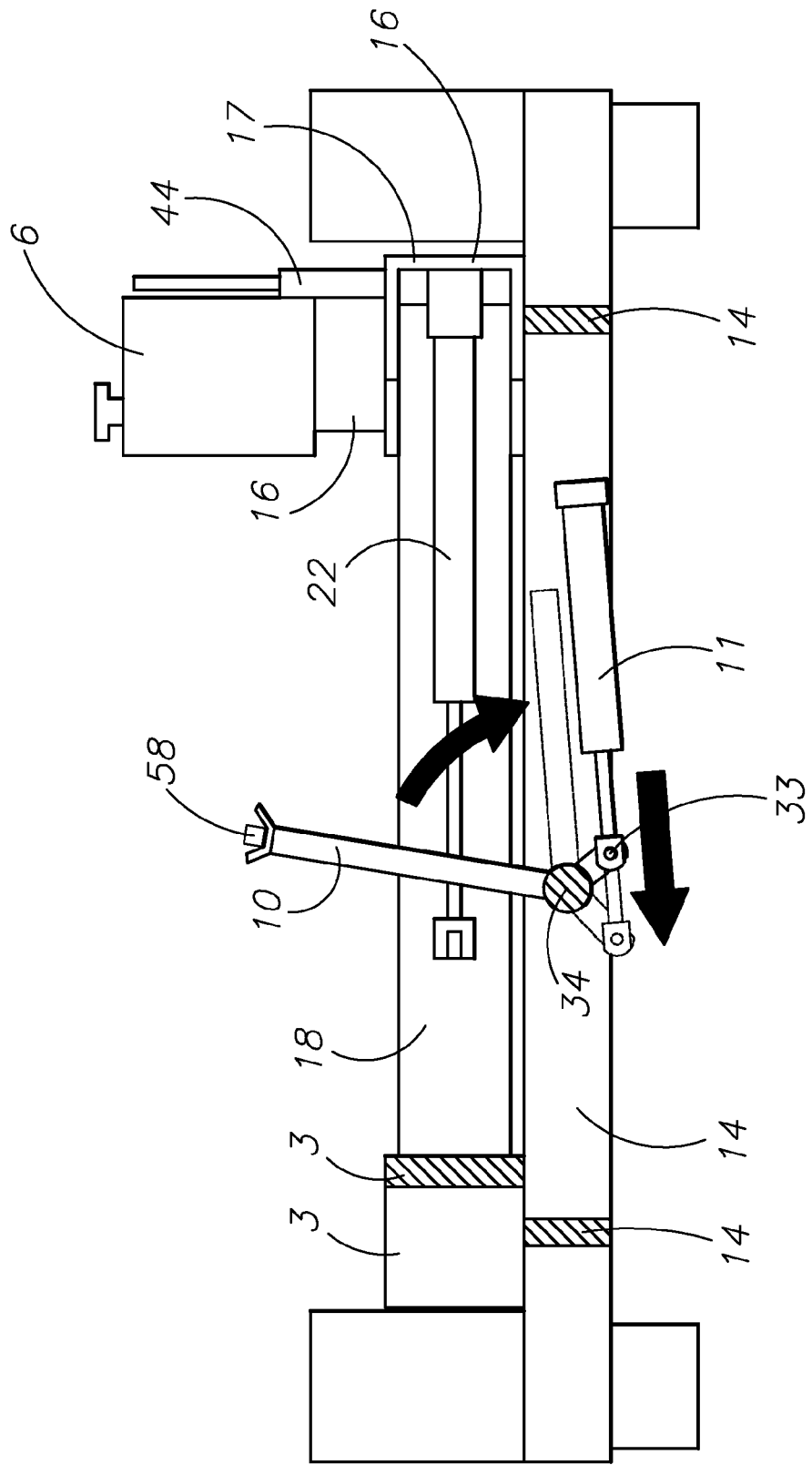
FIG. 11 is a sectional view taken generally along line 11-11 in FIG. 10 showing the movement of a stow lock from a support position to a storage position as a stow lock cylinder is extended.
Figure 12:
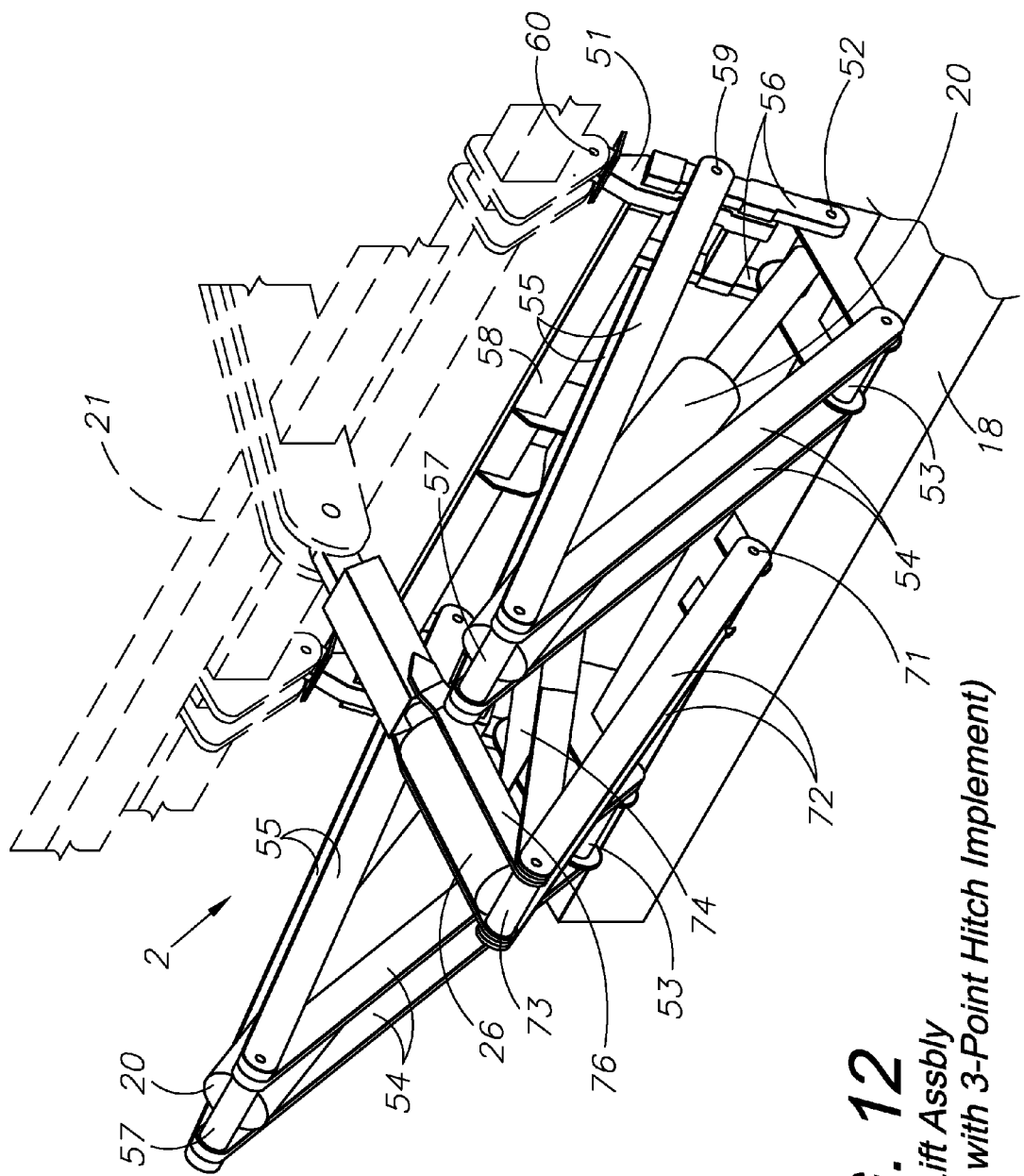
FIG. 12 is an isometric view of the load lift assembly, shown with a three point hitch implement connected thereto.
Figure 13A:
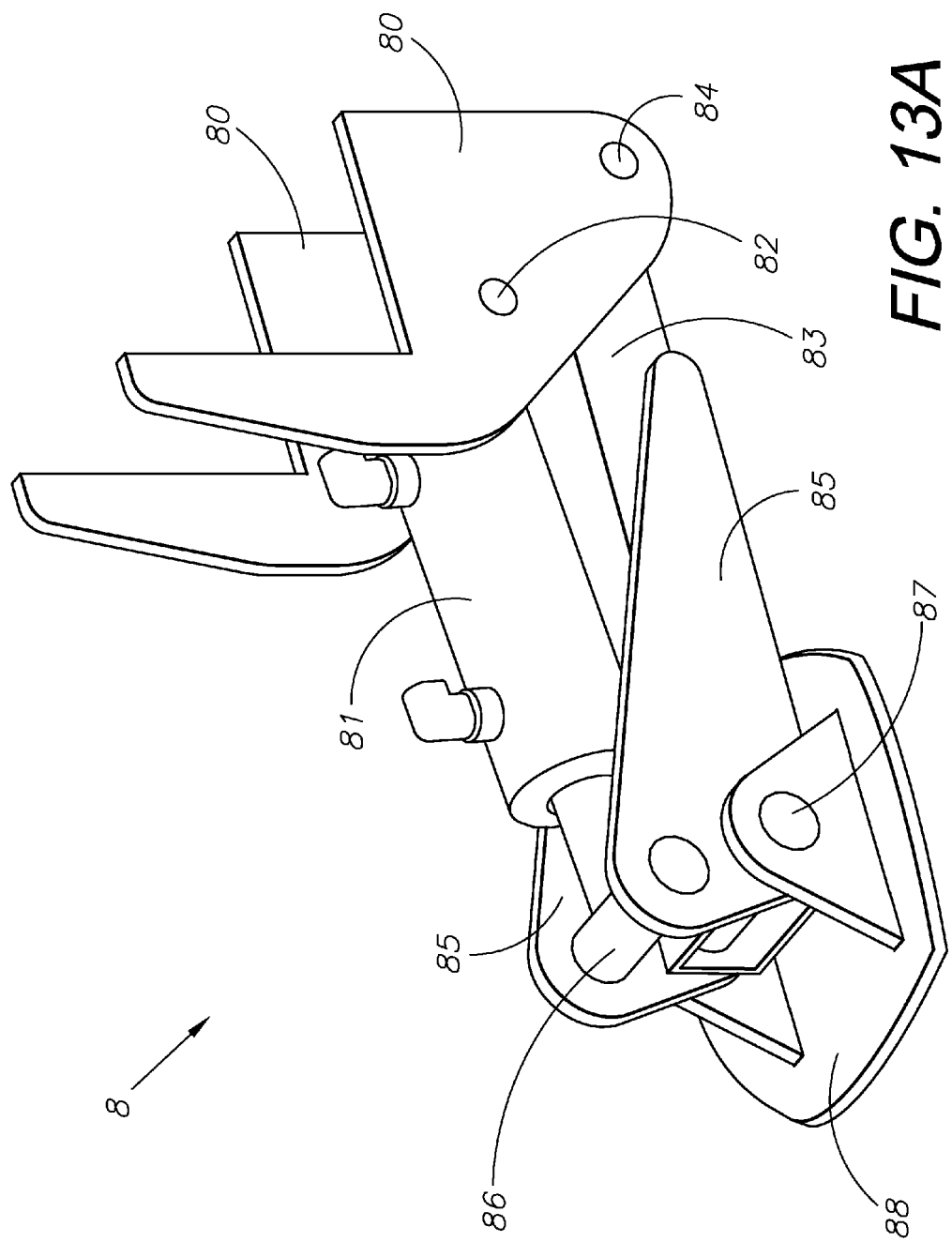
FIG. 13A is an enlarged, isometric view of a stabilizer.
Figure 13B:
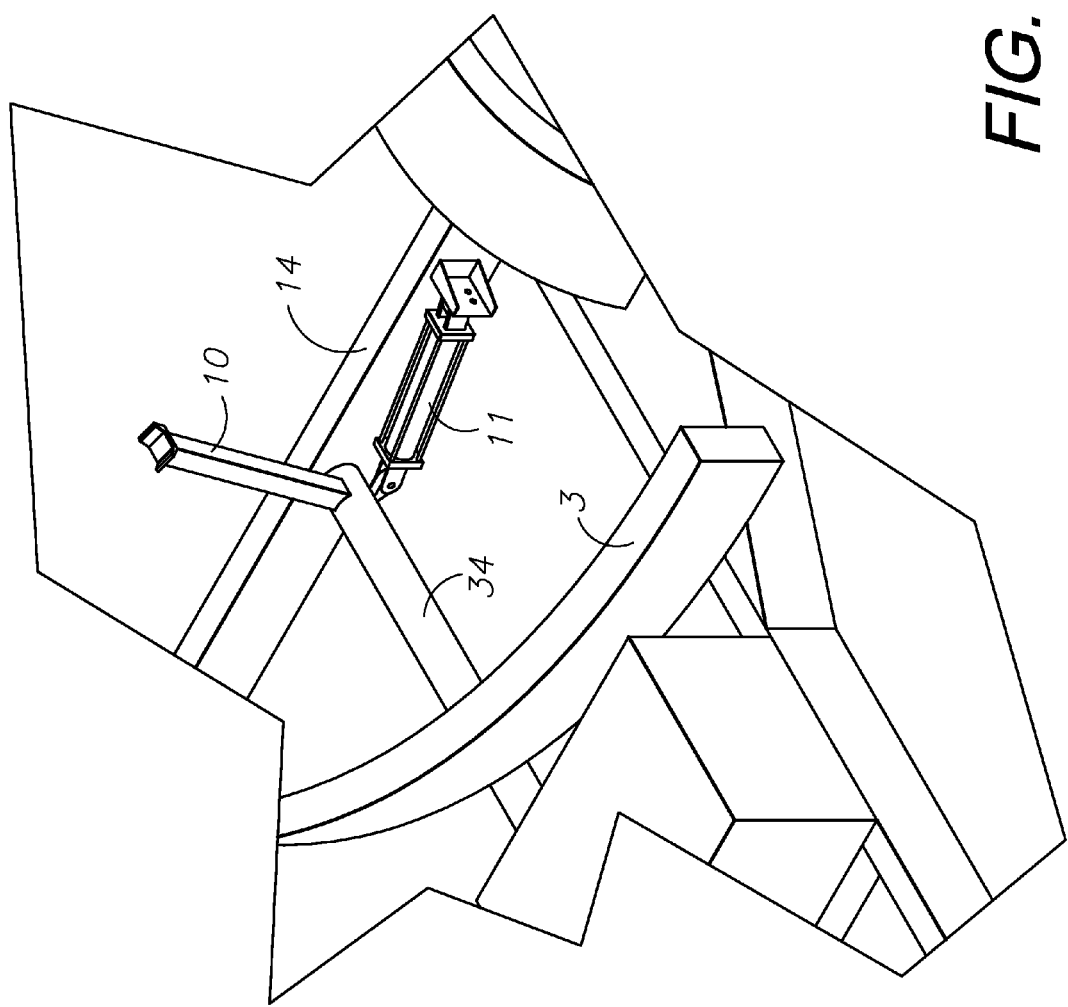
FIG. 13B is an enlarged, isometric view, particularly showing the stow lock, the stow lock cylinder and a stow lock rotation shaft.

Referring to FIGS. 11 and 13B, a stow lock 10, having first and second ends, is attached at its first end to a stow lock pivot member 34. The stow lock pivot member 34 is rotatably attached at each end to the trailer frame 14 and is rotatable between a first, lowered position adapted to allow clearance for the rotator arm 18 to pass over the stow lock 10 and a second, raised position adapted for the second end of the stow lock 10 to engage and support the lift arm crossbar 58. A stow lock cylinder 11 having first and second ends is attached at its first end to the trailer frame 14 and is attached at its second end to the stow lock pivot member 34 by a stow lock pin 33. The stow lock cylinder 11 actuates the movement of the stow lock 10 between its raised and lowered positions.

Figure 10:
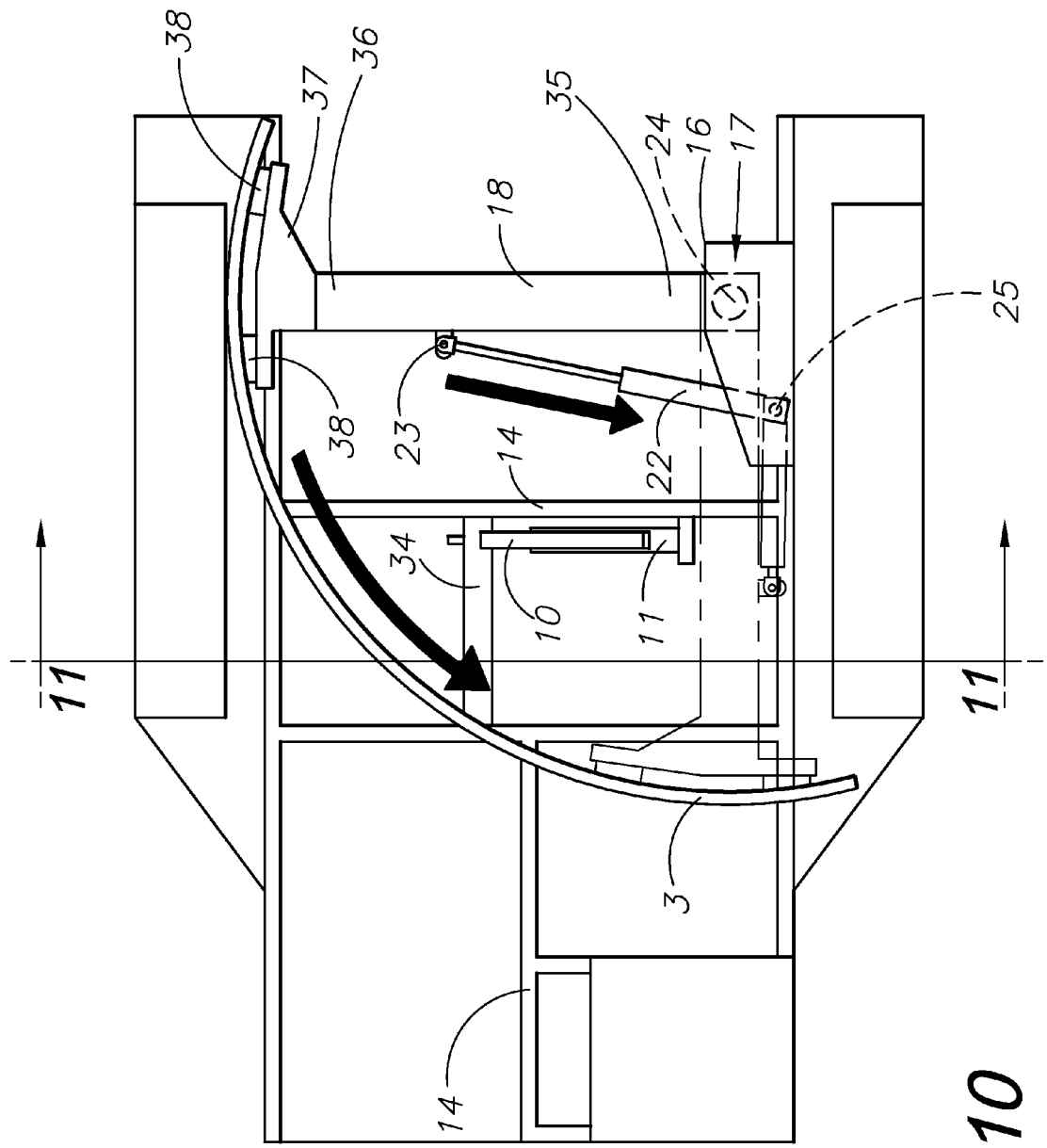
FIG. 10 is a top plan view showing the movement of a rotator arm and a rotator arm guide along a rotation track as a rotation cylinder is retracted.

Referring to FIG. 10, the rotator arm guide 37 is attached to the rotator arm second end 36 in the preferred embodiment and has two guide wheels 38. The weight of the load lift assembly 2 along with the weight of the load attached to it, such as the header adapter 4 and/or an implement 19, is supported on the trailer frame 14 by the two guide wheels 38 engaging the rotation track 3, and the pin assembly 17. In addition to carrying the weight as described above, the two guide wheels 38 provide stabilization to the load lift assembly 2 by distributing the weight forward of and behind the rotator arm 18. Further, the use of a rotator arm guide 37 provides a wider base along which to space the guide wheels 38, thus providing even greater stabilization of the load lift assembly 2.

Referring to FIGS. 1, 10 and 11, the pin assembly housing 16 supports a hydraulic reservoir 6 and a hydraulic valve assembly 44. The hydraulic valve assembly 44 is used to control the hydraulic system 41, and thus the lifting and rotating of the rotating lift system 1. A unique feature of the rotating lift system 1 is the location of the hydraulic valve assembly 44, which location enables an operator to control the lifting and rotating mechanisms of the rotating lift system 1 from a single location.

Figure 3:
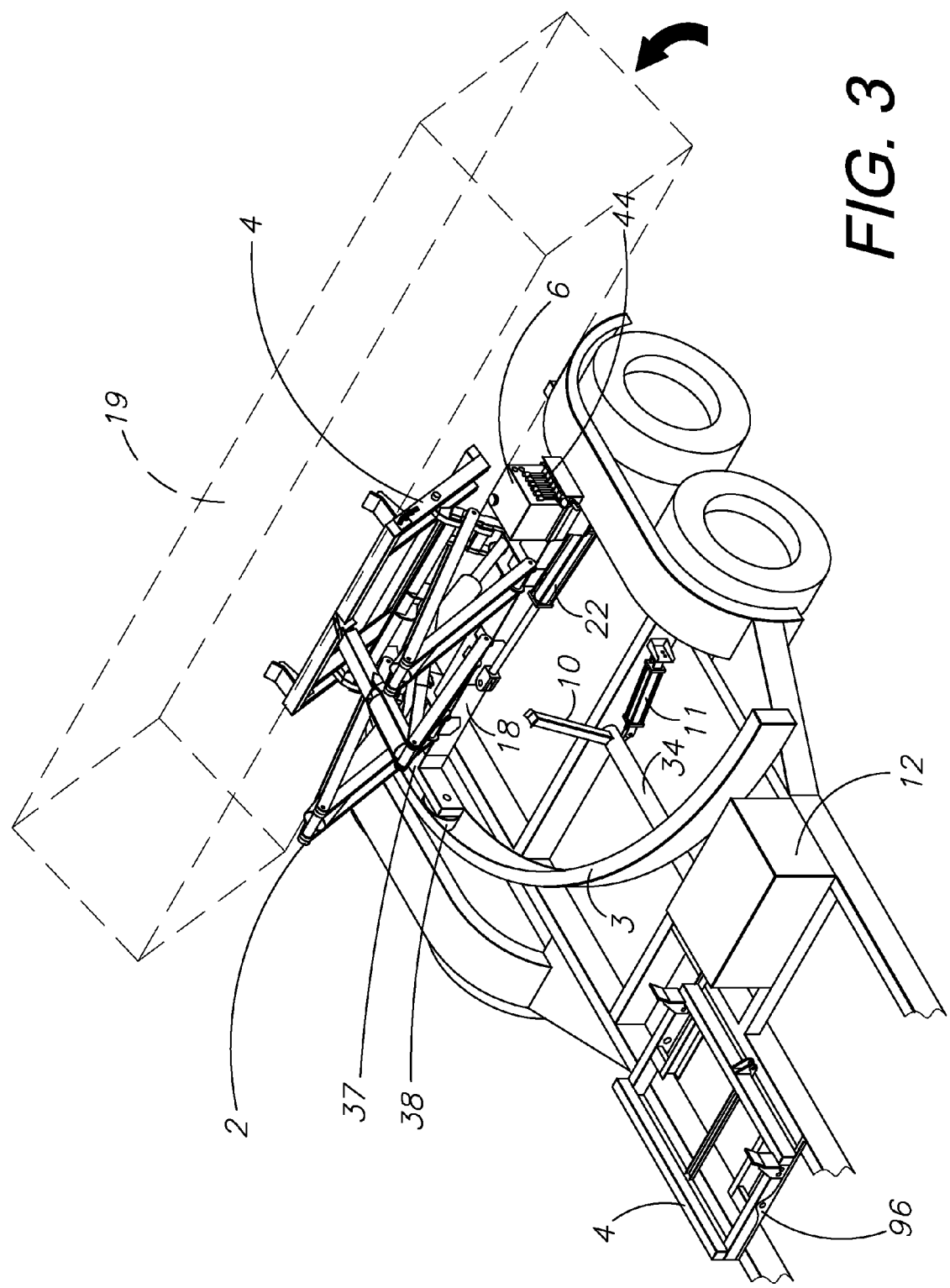
FIG. 3 is an isometric view of the rotating lift system with the load lift assembly in a raised, loading position.
Figure 4:
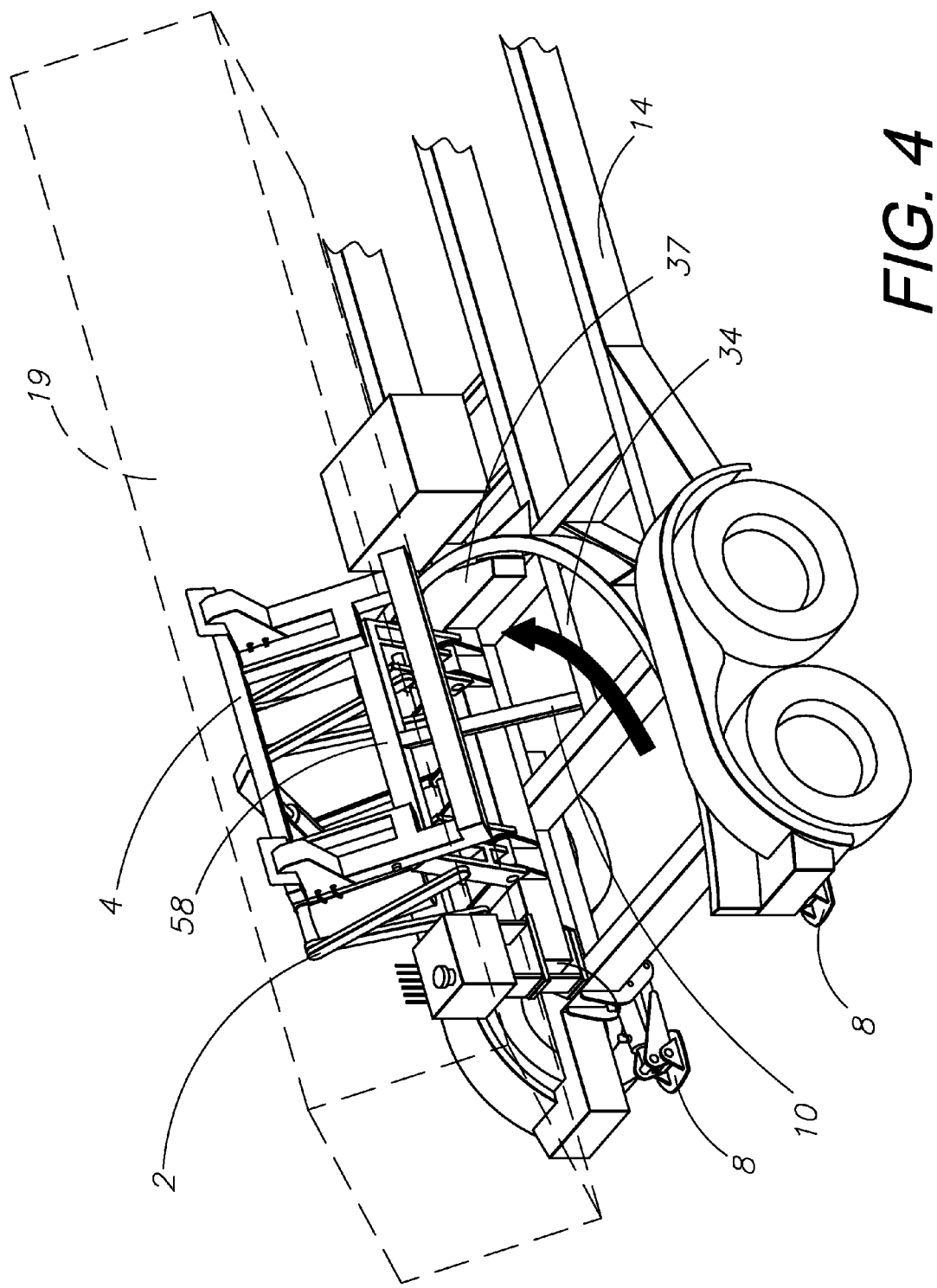
FIG. 4 is an enlarged, isometric view taken generally within the circle shown in FIG. 1 of the rotating lift system of the present invention with the load lift assembly in a raised, rotated, transport position.
Figure 5:
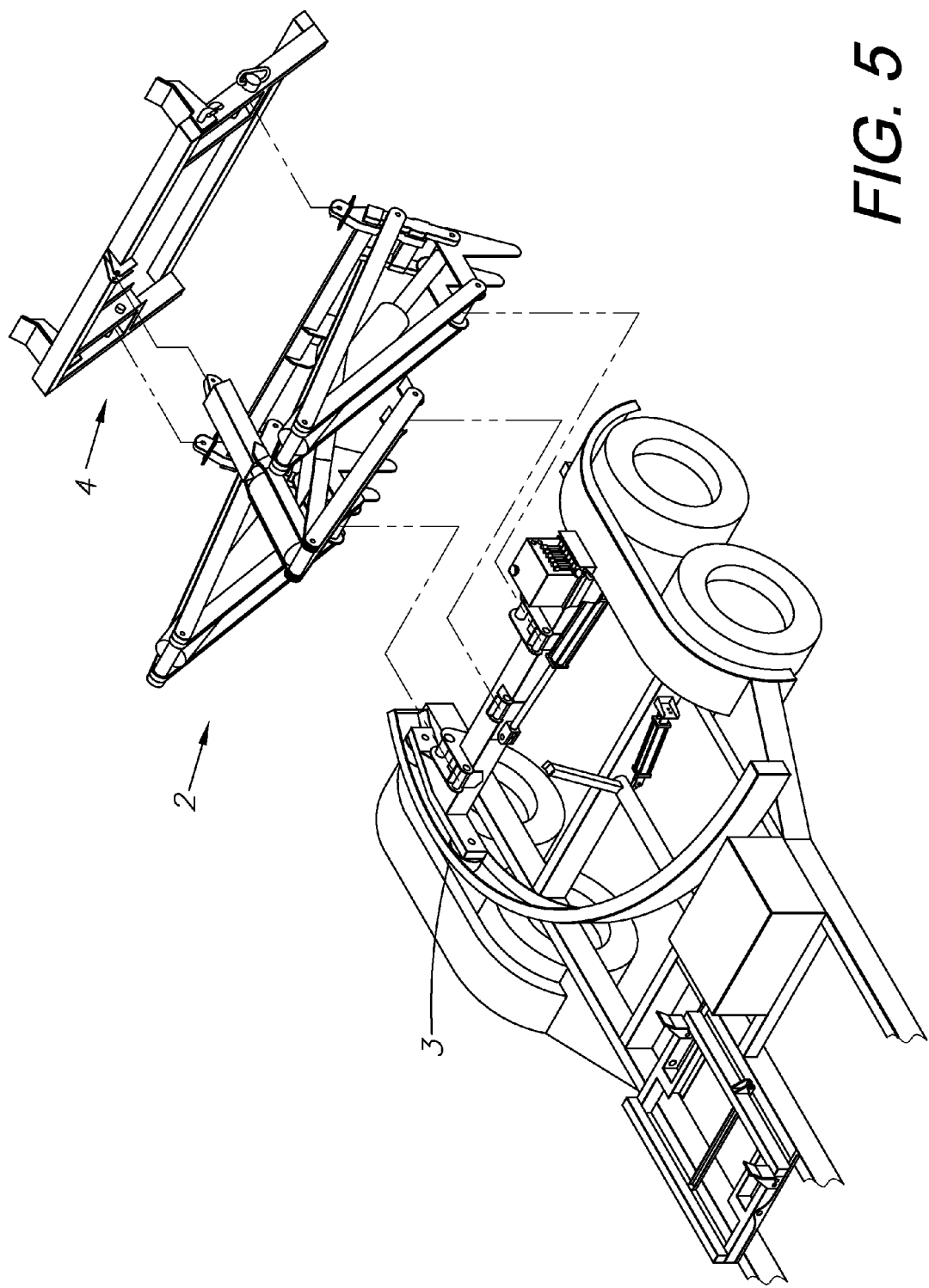
FIG. 5 is an exploded, isometric view of the rotating lift system.
Figure 6:
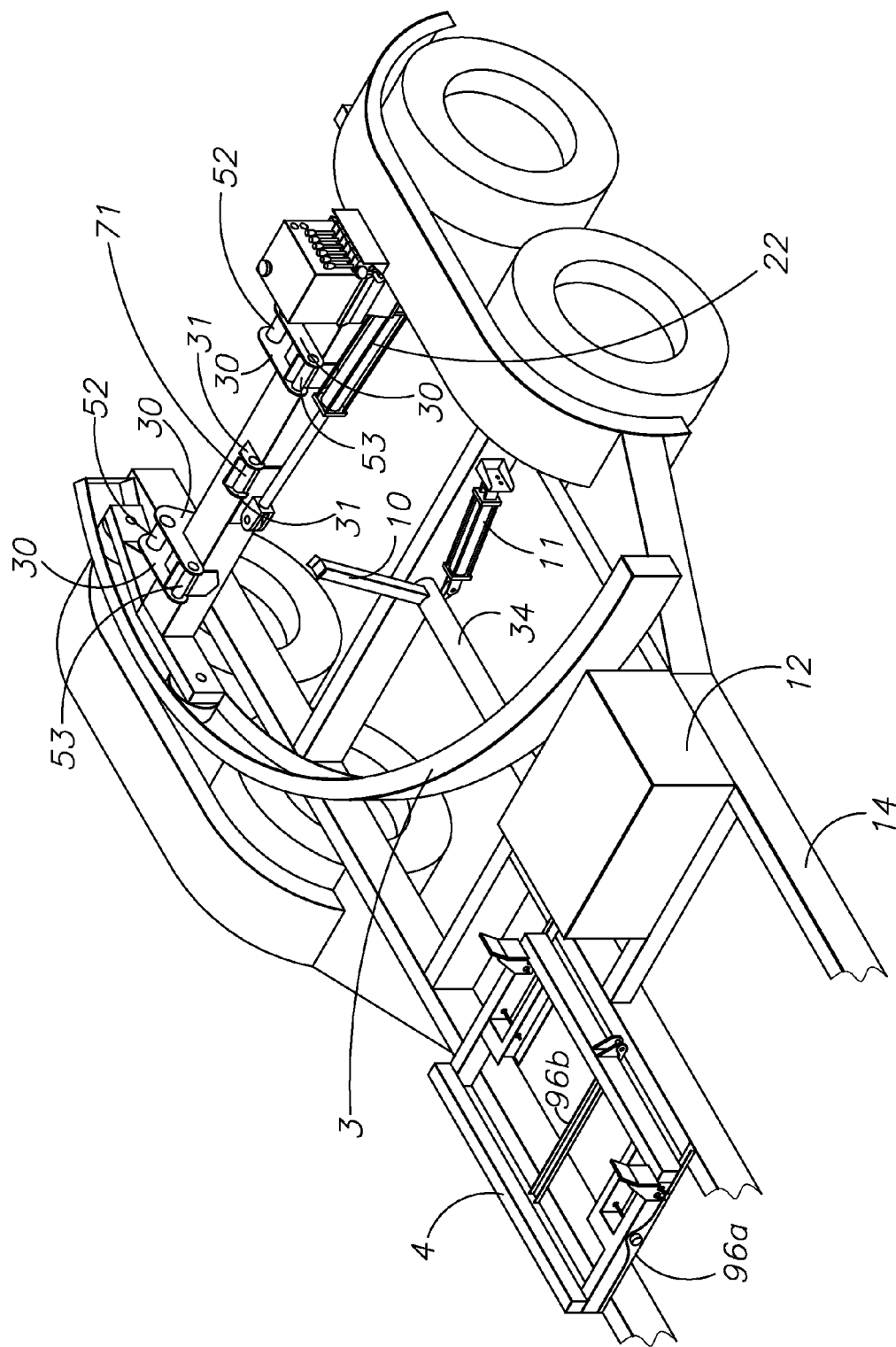
FIG. 6 is an enlarged, isometric view of the rotating lift system, shown without the load lift assembly.
Figure 7:
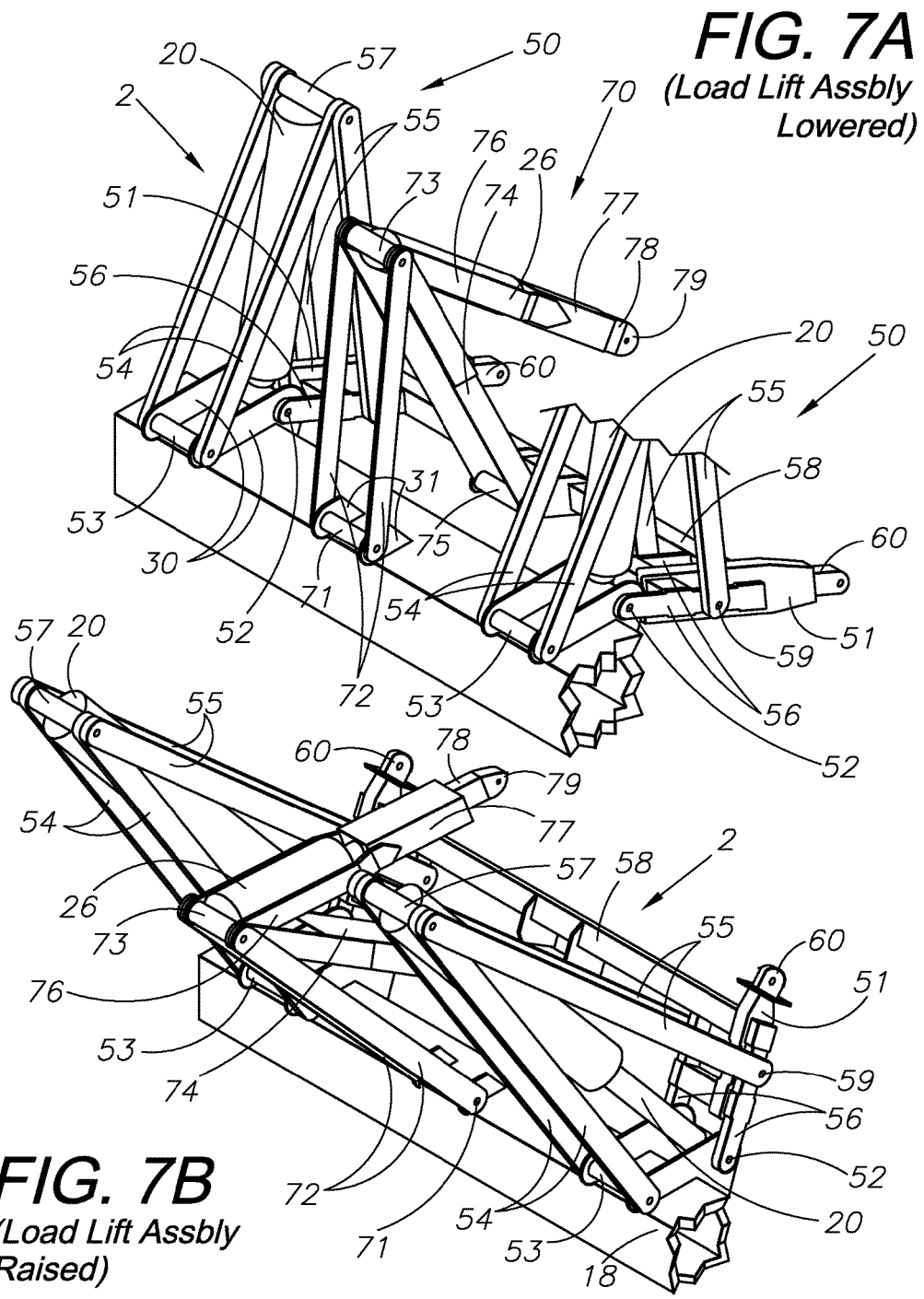
FIG. 7A and FIG. 7B are isometric views of the load lift assembly in lowered and raised positions, respectively.

Referring to FIGS. 2, 3, 4, 7A and 7B, a method of lifting an implement 19 or 21 comprises a three step process where first the load lift assembly 2 attaches to the implement 19 or 21, second the load lift assembly 2 lifts the implement 19 or 21 to a raised position (as shown in FIG. 3), and third the rotator arm 18 rotates the load lift assembly 2 and the attached implement 19 or 21 to a transport position (as shown in FIG. 4). The implement 21 includes a three point hitch connection and is attached to the rotating lift system 1 by attaching the three-point hitch connectors, the lower connectors 60 and the upper connector 79 to the implement 21.

The implement 19 includes a header connection and is attached to the rotating lift system 1 by positioning the header adapter 4 at a point where the implement 19 rests on the header adapter brackets 94 and against the header lift adapter 92. The implement 19 or 21 is raised by the lower lift arms 51 being raised by the extension of the lift cylinders 20. The implement 19 or 21 is rotated to a transport position as the rotator arm 18 rotates about the rotator arm pin 24. To further stabilize and secure the loaded implement 19 for transport, the stow lock 10 is rotated into its raised position and engages the lift arm cross bar 58.

Figure 14:
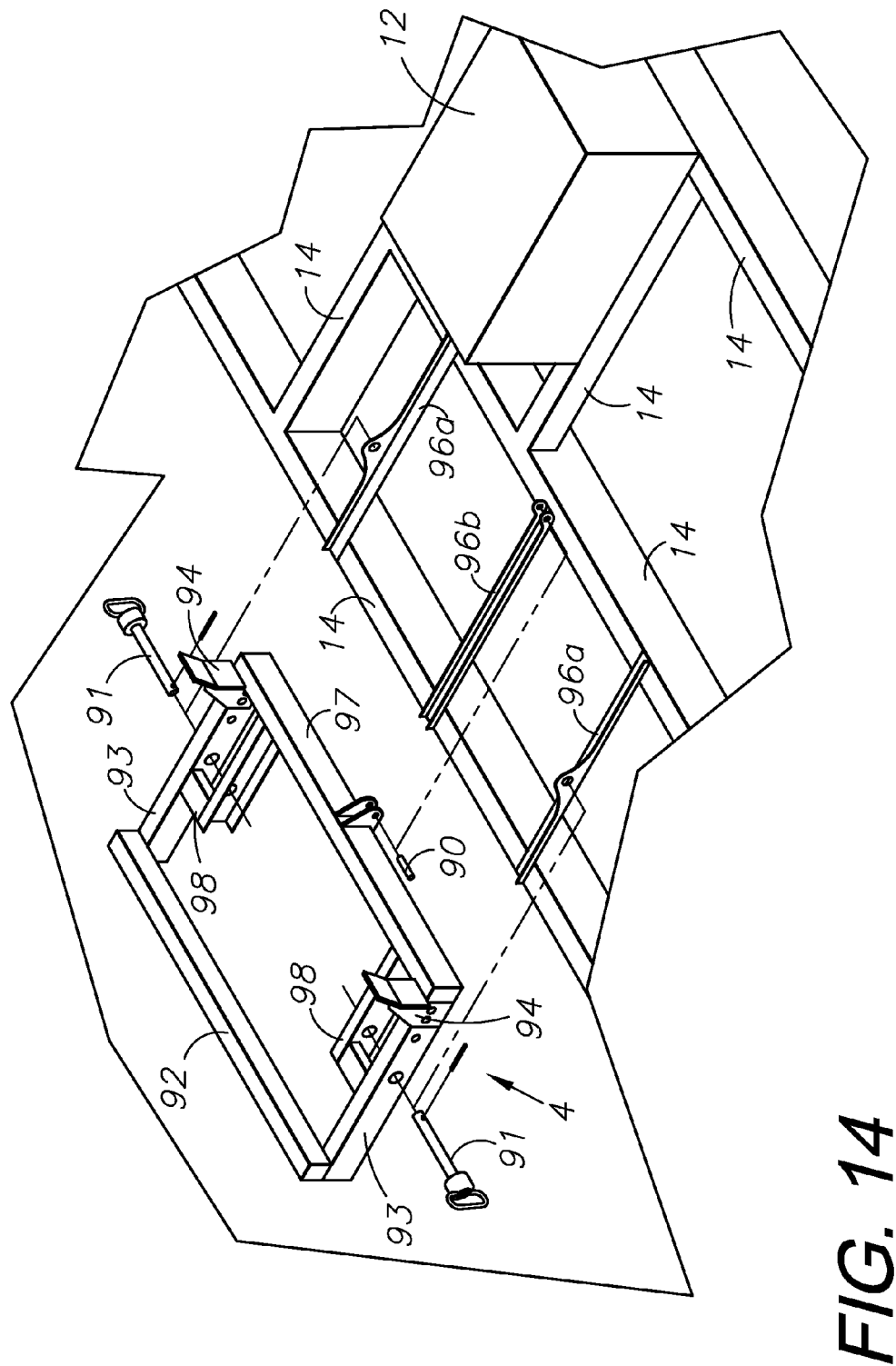
FIG. 14 is an enlarged, isometric view, particularly showing the header adapter and a header adapter storage bracket.
Figure 17:
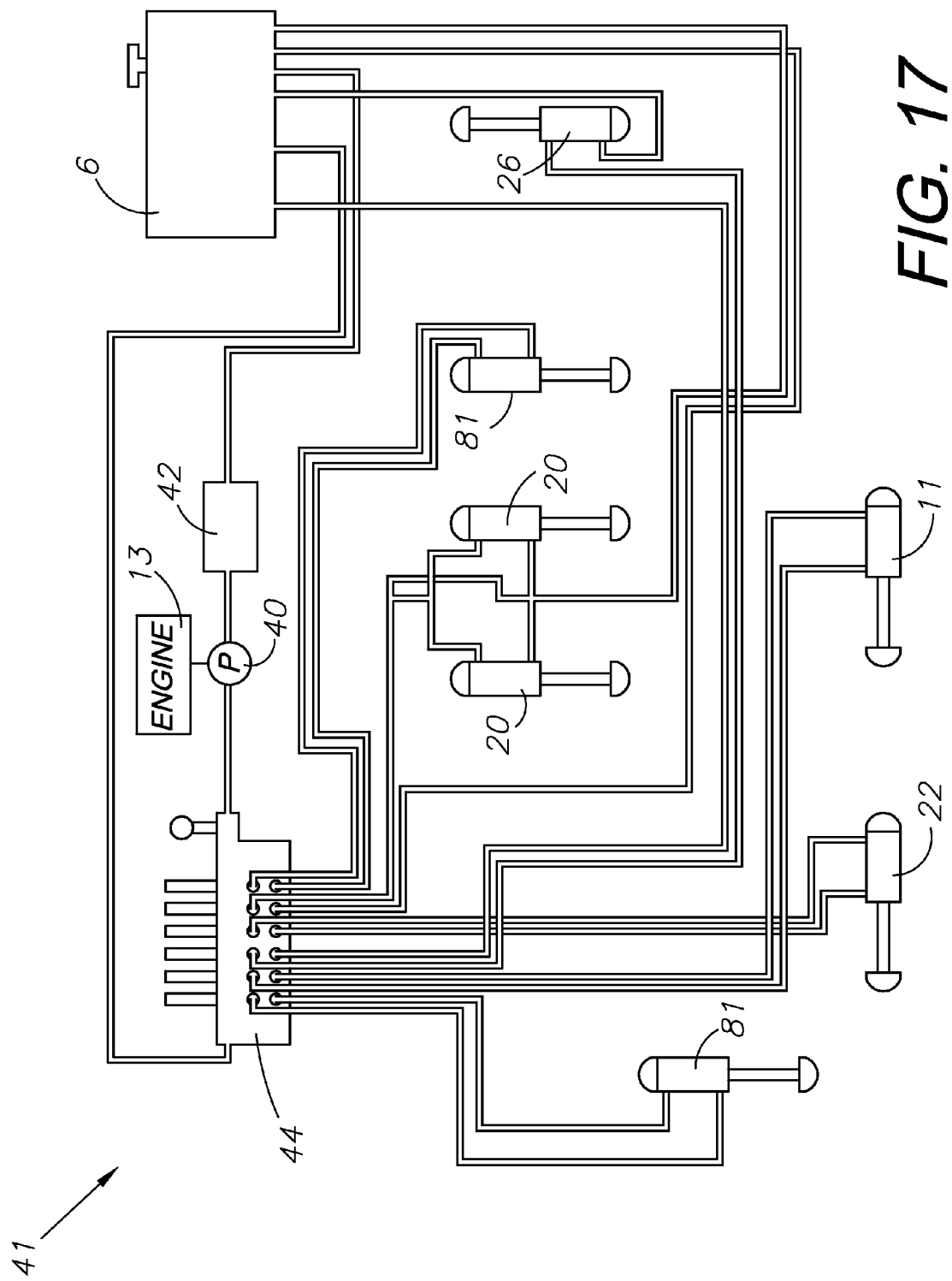
FIG. 17 is a schematic diagram of the hydraulic system.
Figure 18:
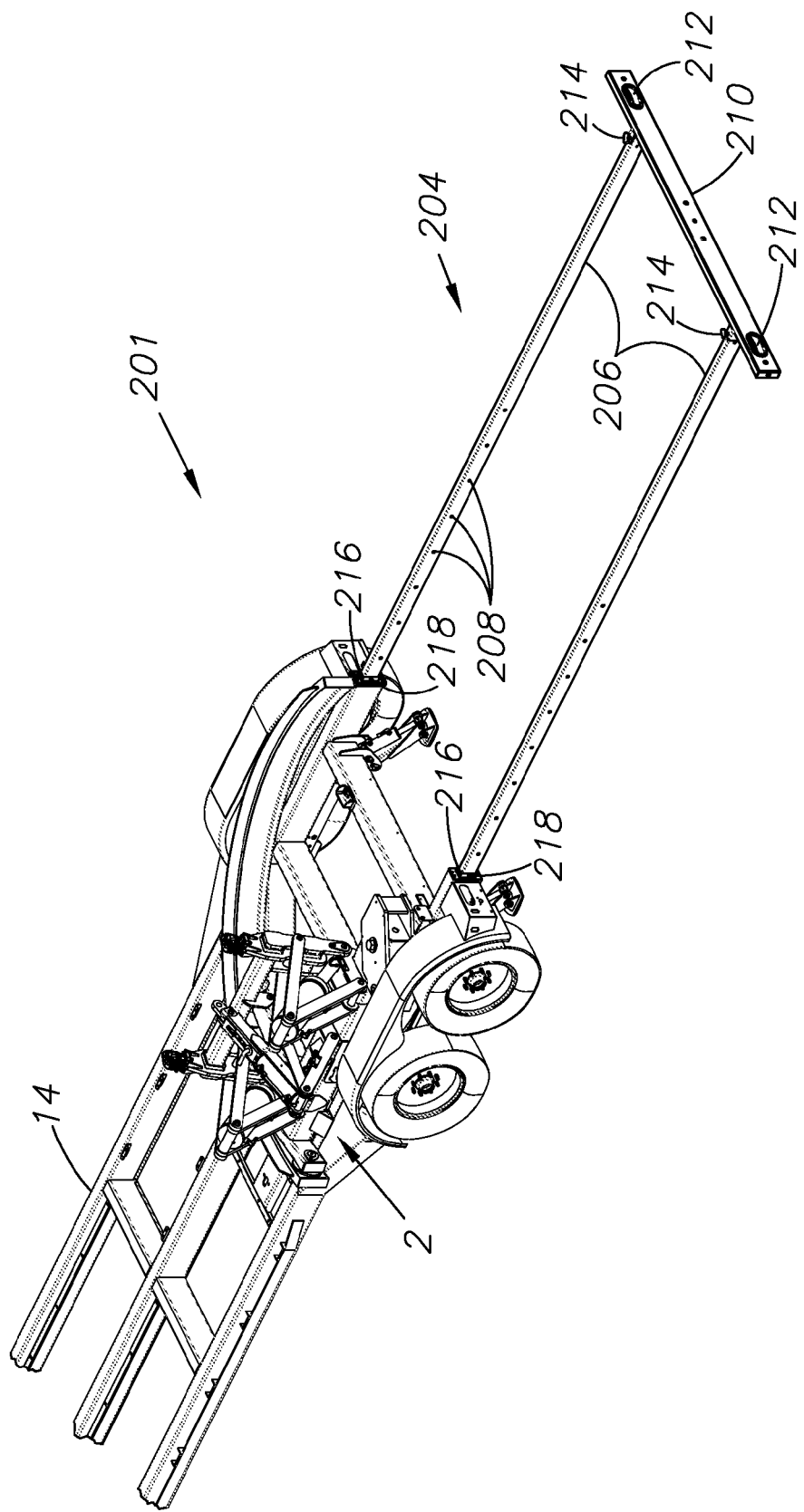
FIG. 18 is an isometric view of an alternative embodiment load lift assembly with an extended, telescoping light bar.
Figure 19:
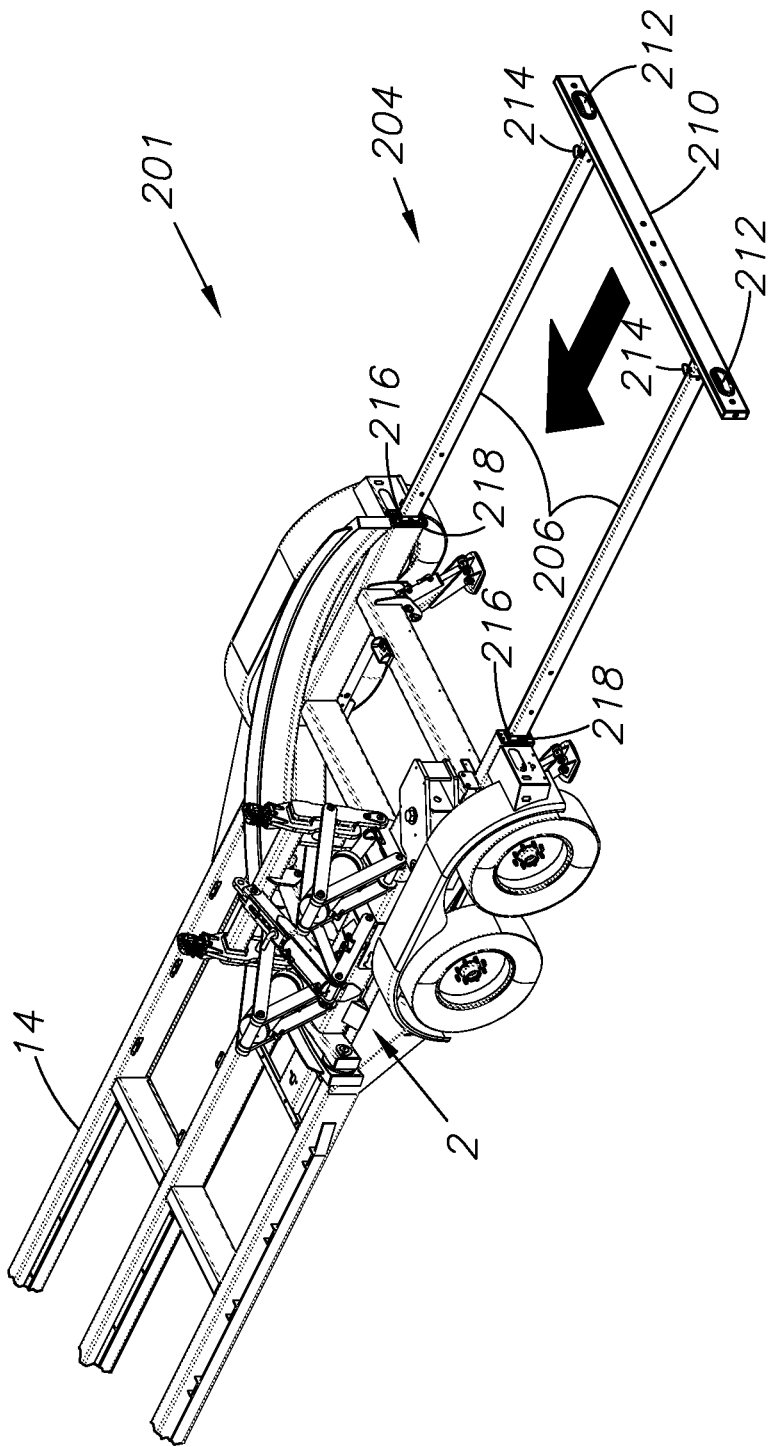
FIG. 19 is an isometric view thereof, showing the light bar being retracted into the structure of the load lift assembly.
Figure 20:
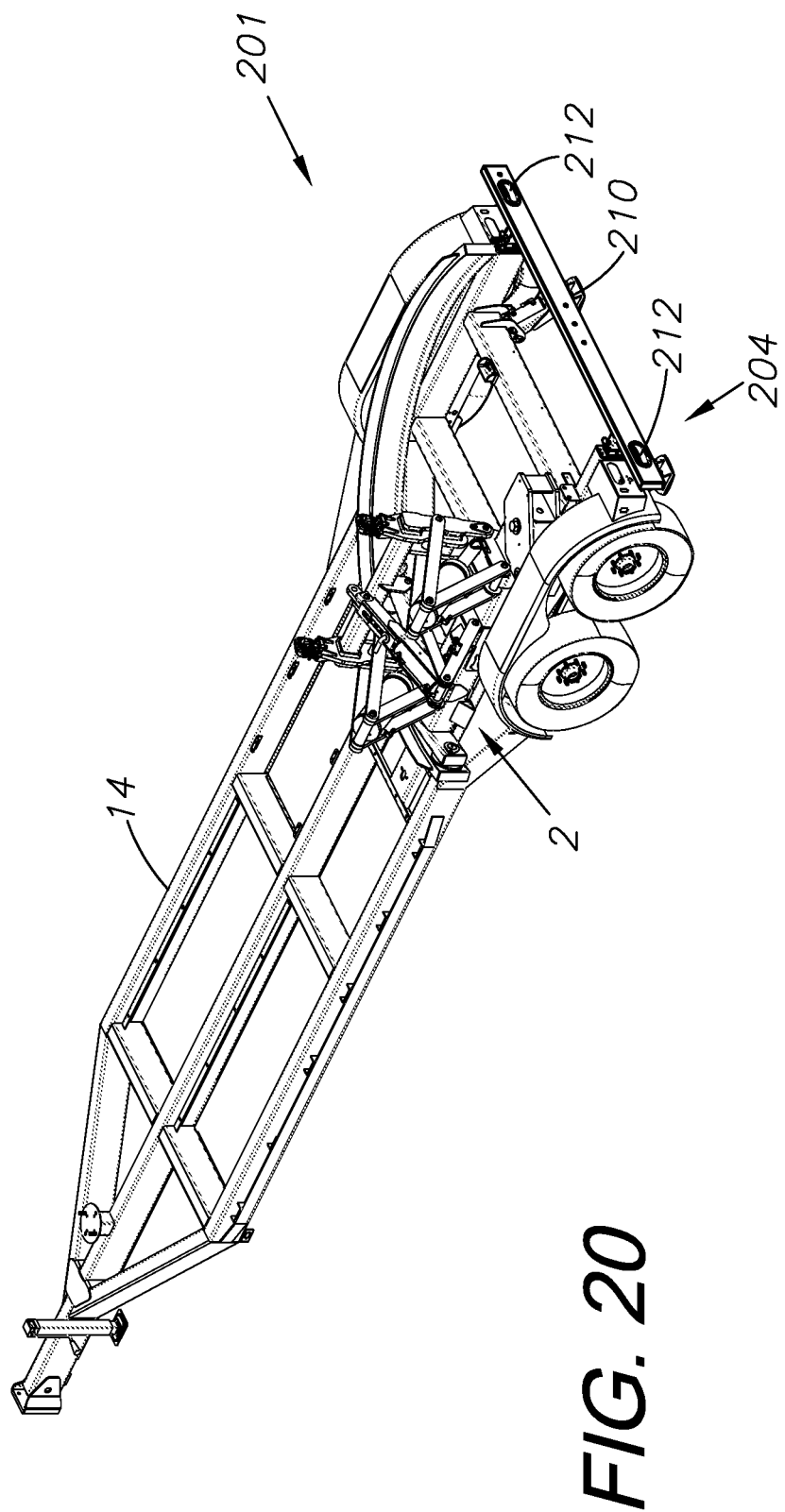
FIG. 20 is an isometric view thereof, showing the light bar being fully retracted into the structure of the load lift assembly.
Figure 21:
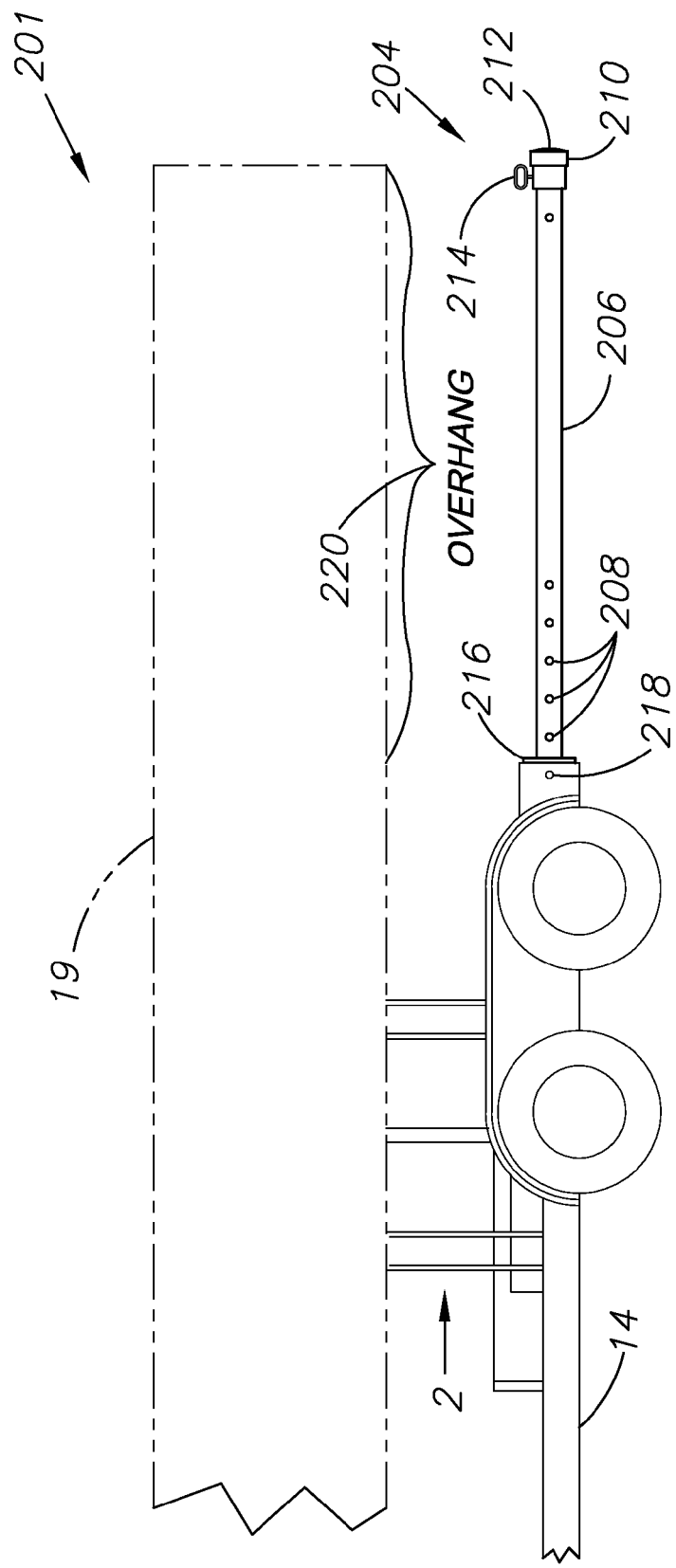
FIG. 21 is a side elevational view thereof, demonstrating the functionality of the telescoping light bar.

Referring to FIG. 14, header adapter storage brackets 96a, 96b are attached to the trailer frame 14. When not in use, the header adapter 4 can be stored in the header adapter storage brackets 96a, 96b by securing it with the lower header pins 91 and the upper header pin 90. Referring to FIG. 17, a hydraulic system 41 is attached to various points as defined above and is connected by hoses (FIG. 17) and is operated in a conventional manner. The hydraulic system 41 includes a pump 40 driven by the engine 13, which hydraulically connects to the other hydraulic system components via a filter 42.

Referring to FIGS. 1 and 13A, each stabilizer 8 attached to the rear of the trailer frame 14 comprises a pair of stabilizer trailer brackets 80, a stabilizer cylinder 81, a stabilizer cylinder trailer pin 82, a stabilizer link 83, a stabilizer link trailer pin 84, a pair of stabilizer brackets 85, a stabilizer cylinder pin 86, a stabilizer link pin 87, and a stabilizer pad 88. The stabilizer trailer brackets 80 are attached to the trailer frame 14. Each stabilizer cylinder 81 is attached at its first end to a stabilizer trailer bracket 80 by a stabilizer cylinder trailer pin 82. Each stabilizer cylinder 81 second end is attached to a respective stabilizer bracket 85 by a stabilizer cylinder pin 86. Each stabilizer link 83 has a first end attached to the stabilizer trailer brackets 80 by a stabilizer link trailer pin 84 and a second end attached to a stabilizer bracket 85 by a stabilizer link pin 87. Each stabilizer pad 88 is attached to a respective stabilizer link 83 by a respective stabilizer link pin 87.

When loading an implement 19, the combined weight of the rotating lift system 1 and the implement 19 is transferred to the stabilizers 8 from the wheels 28 and 29 by lowering the stabilizer 8. The stabilizers 8 are lowered by the stabilizer cylinders 81 extending causing the stabilizer pads 88 and stabilizer links 83 to rotate counterclockwise in an arcuate path until the stabilizer pad 88 engages the ground and lifts the rotating lift system 1 enough to effectuate the weight transfer.

Figure 15:
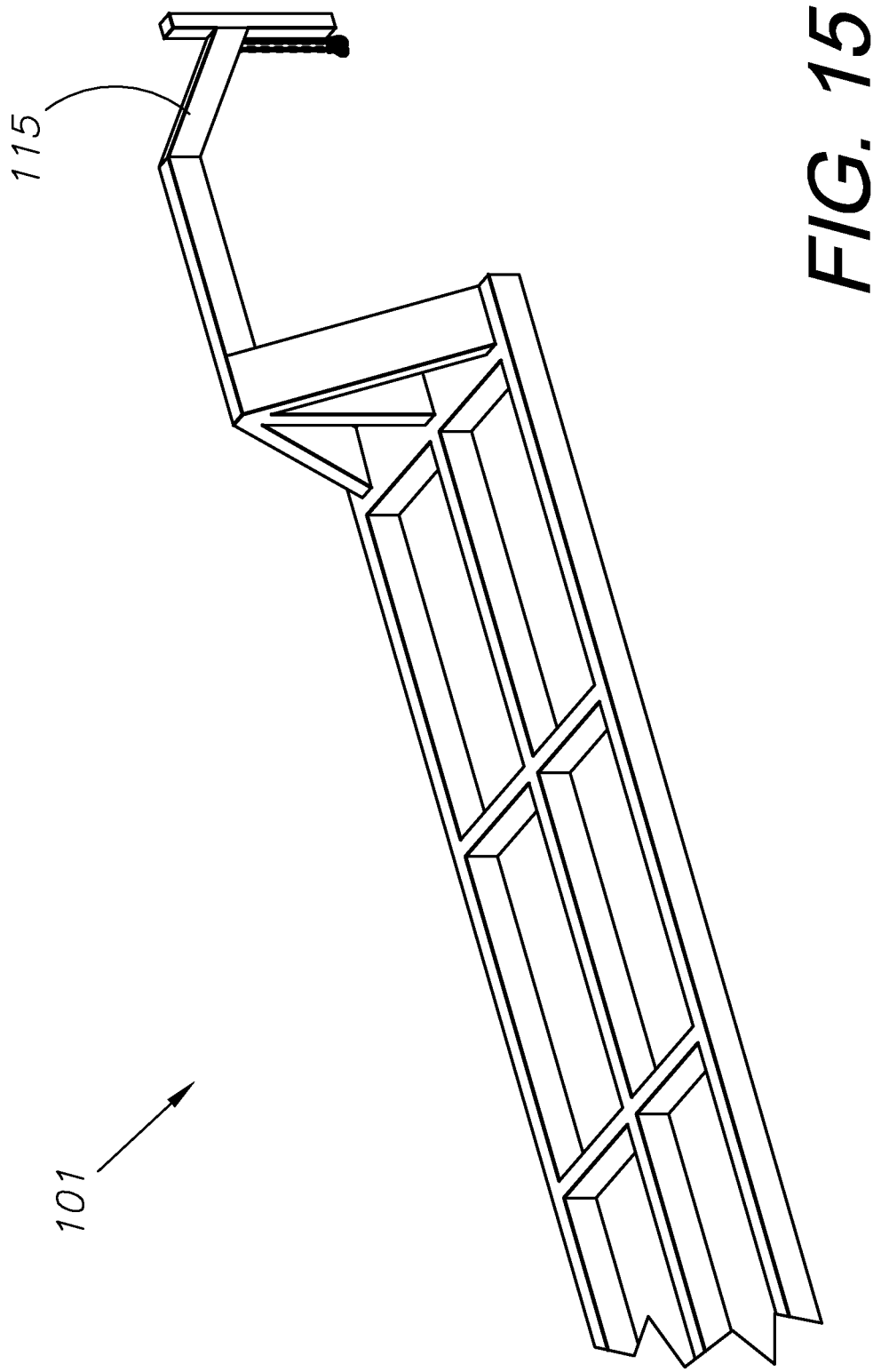
FIG. 15 is an enlarged, isometric view, particularly showing a modified trailer frame with a gooseneck attachment.

Referring to FIG. 1, the rotating lift system 1 is shown with a bumper pull trailer hitch 15. Referring to FIG. 15, an alternative embodiment rotating lift system 101 is shown with a gooseneck trailer hitch 115. FIG. 16 shows sloped header adapter brackets 194, which are an alternative to the header adapter brackets 94 for accommodating combine headers and other loads with structural configurations corresponding to the alternative header adapter brackets 194. It will be appreciated that other adapters can be utilized with the rotating lift system 1 for loading and transporting a variety of loads with various configurations in multiple sizes.

III. Alternative Embodiment or Aspect of the Self Loading Trailer

FIGS. 18-21 show an alternative embodiment self-loading trailer 201, including a modified trailer body 214 having receiver slots 216 for receiving the telescoping rails 206 of a telescoping light bar assembly 204. A light bar 210 is affixed to the ends of the telescoping rails 206 via quick release connecting pins 215 or similar semi-permanent connections. The light bar 210 includes safety lights 212 which extend the reach of the safety lights of the original trailer 214 beyond the overhang distance 220 of the end of the transported implement 19. For example, the light bar 210 may include brake lights and turning signals which receive the appropriate signals from the trailer 214 or the truck towing the trailer.

A number of pin receiver holes 208 are located in the sides of the rails 206. These pin holes allow the telescoping rails to be locked at varying distances from the trailer 214 via a corresponding pin hole 218 located in the trailer. Similarly, the light bar 210 is connected to the opposite end of the rails 206.

IV. Alternative Embodiment or Aspect Load Lift Assembly

Figure 22:
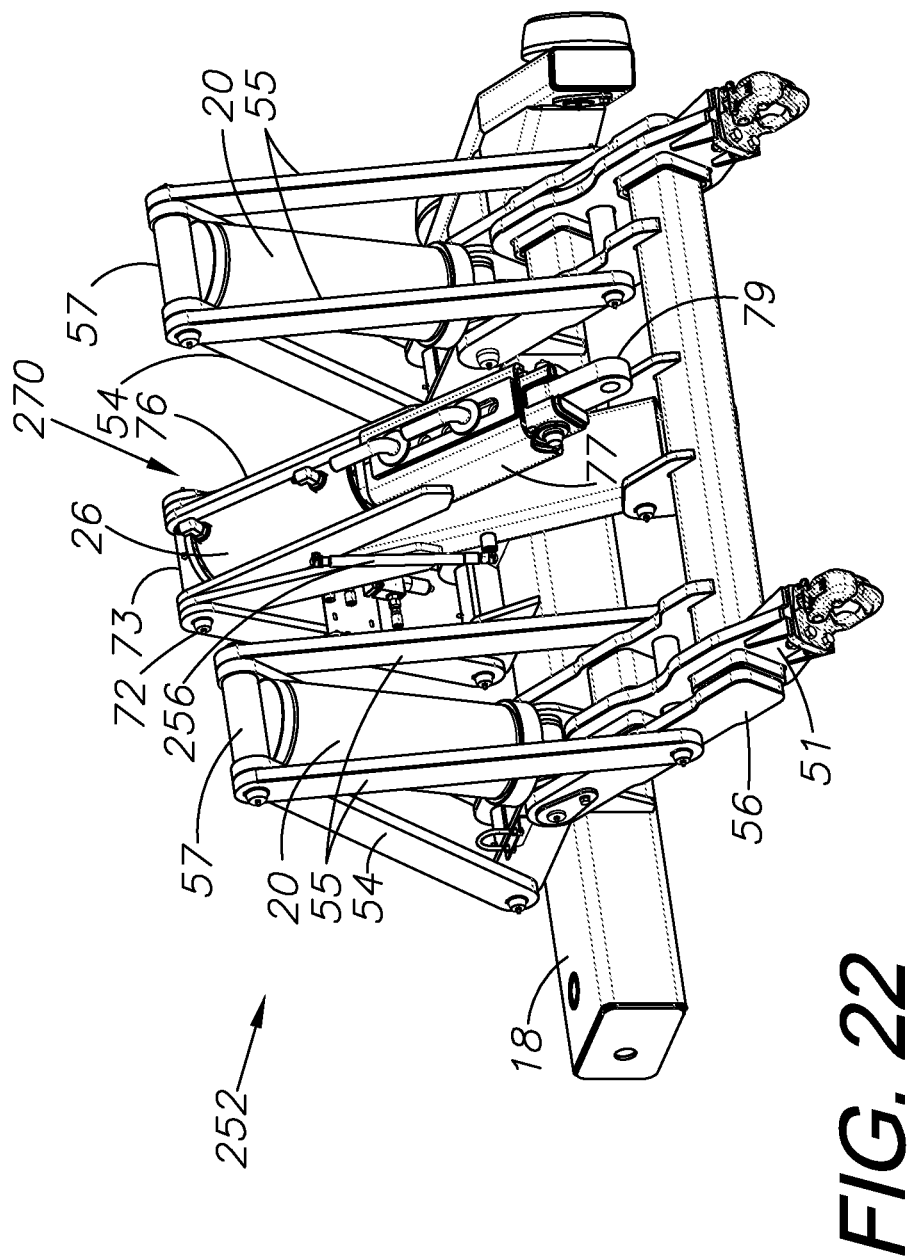
FIG. 22 is an isometric view of an alternative embodiment load lift assembly.

FIG. 22 shows an alternative embodiment of a load lift assembly 252 which generally includes the same components mentioned above. However, the alternative embodiment includes a pair of gas struts 256 used to assist with the lifting and lowering action of the load lift assembly 252 during connecting and disconnecting of three point implements. The struts are affixed to the upper linkage assembly 270.

V. Alternative Embodiment Implement Lift System 302

Figure 31:
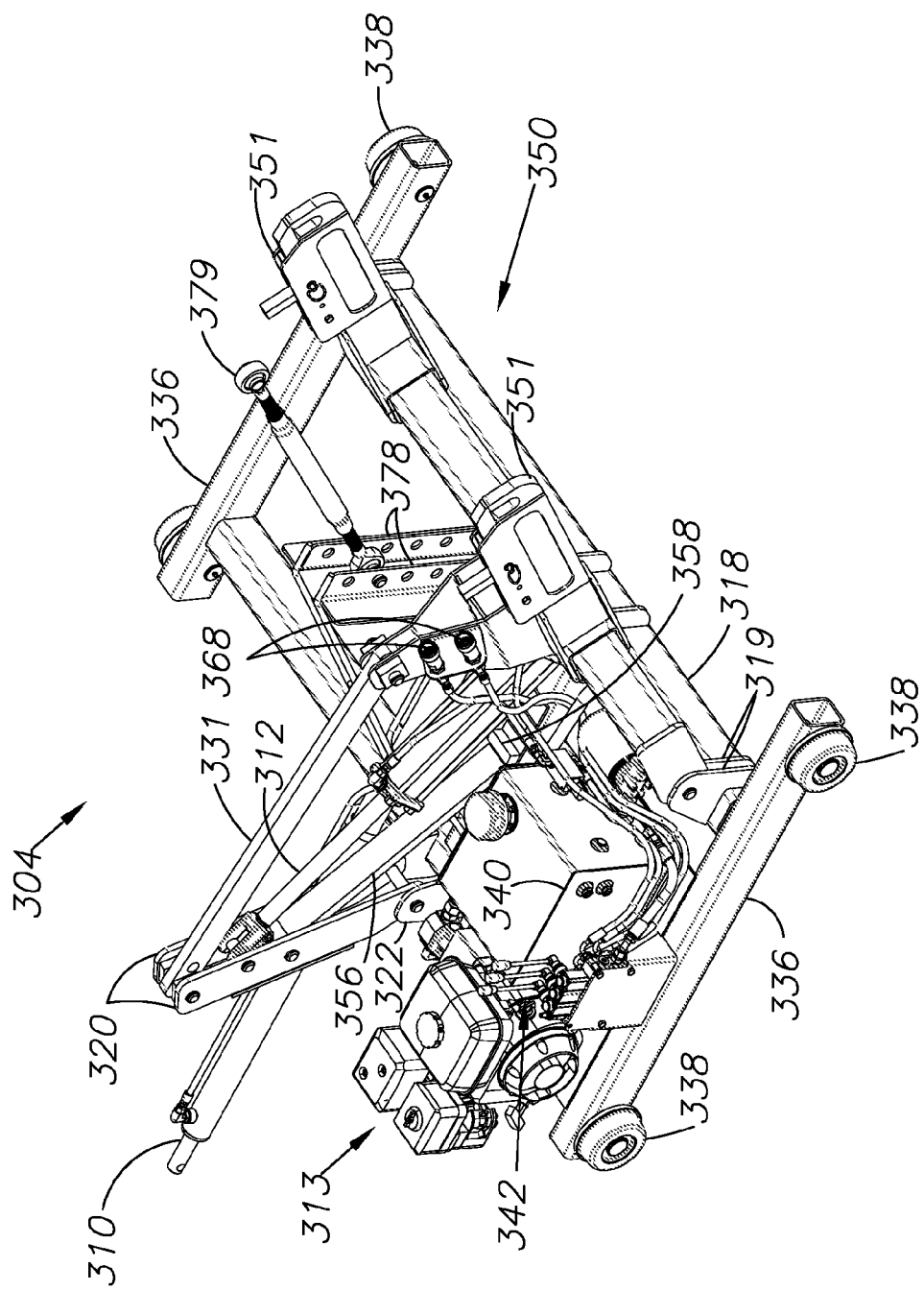
FIG. 31 is an isometric view of the embodiment of FIGS. 23-30 without its typical environment.
Figure 32:
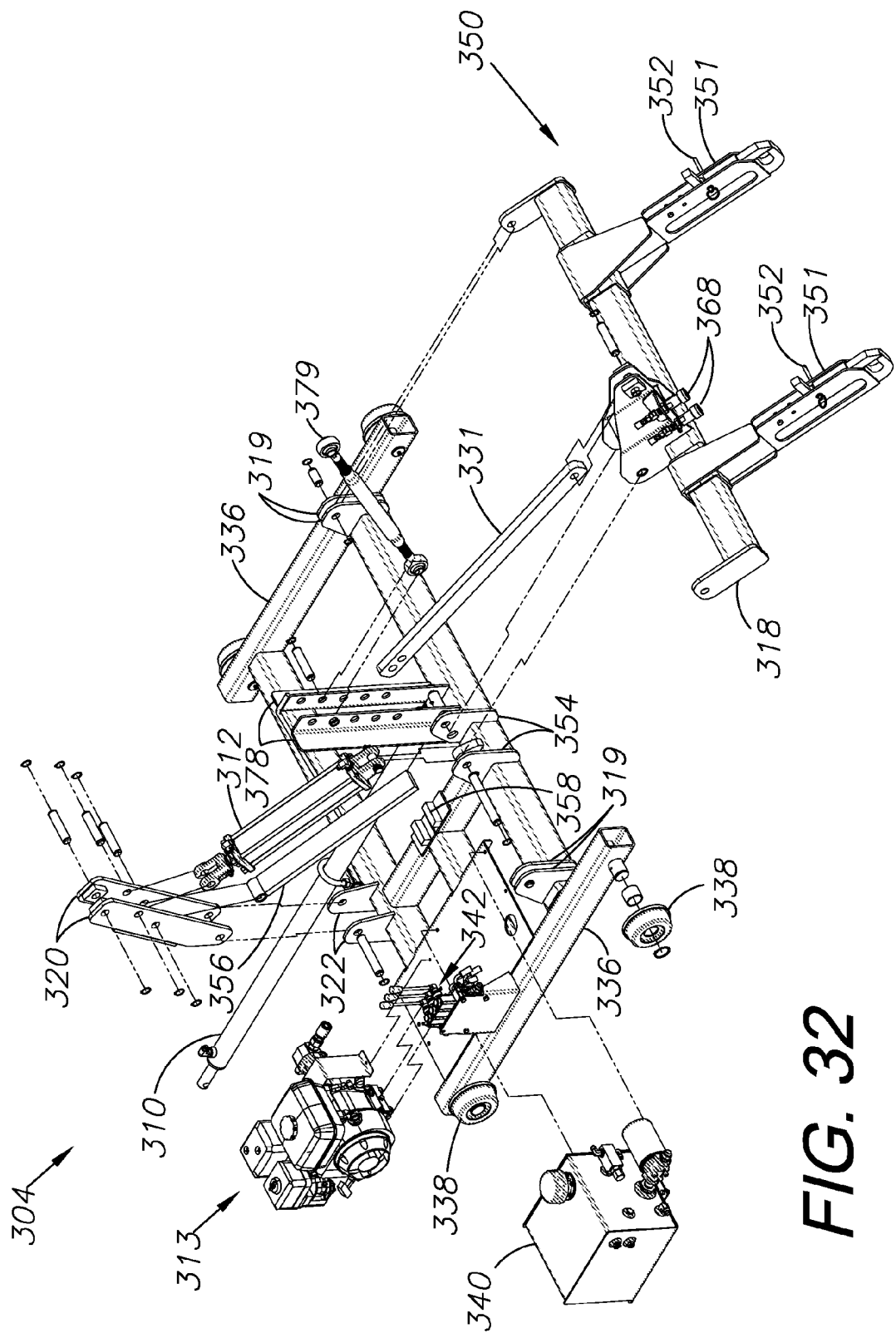
FIG. 32 is a partially exploded isometric view thereof.

FIGS. 23-32 show an alternative embodiment Implement Lift System 302, which is typically composed of a lifting assembly 304 mounted onto a trailer frame 314 as shown in FIGS. 23-30. FIGS. 31-32 show the lifting assembly 304 by itself. The lifting assembly 304 may be mounted to another vehicle type other than a trailer; however, the preferred embodiment would be deployed within a trailer.

The trailer includes a frame 314, a hitch 315 for towing the trailer, an optional chain 316 for added security and stability, a jack 307 for stabilizing the trailer when hooking or unhooking from a towing vehicle (not shown), and a pair of tires 328 mounted about an axle assembly 346. The tires could be mounted on an actual axle; however, as shown in the FIGS. 23-30, the axle assembly mounts the wheels to the frame 314 of the trailer and provides a structural support between the wheels. When an implement 305 is loaded onto the trailer, ideally it will be centrally held over the axle assembly 346 for superior support while transporting the implement.

Figure 23:
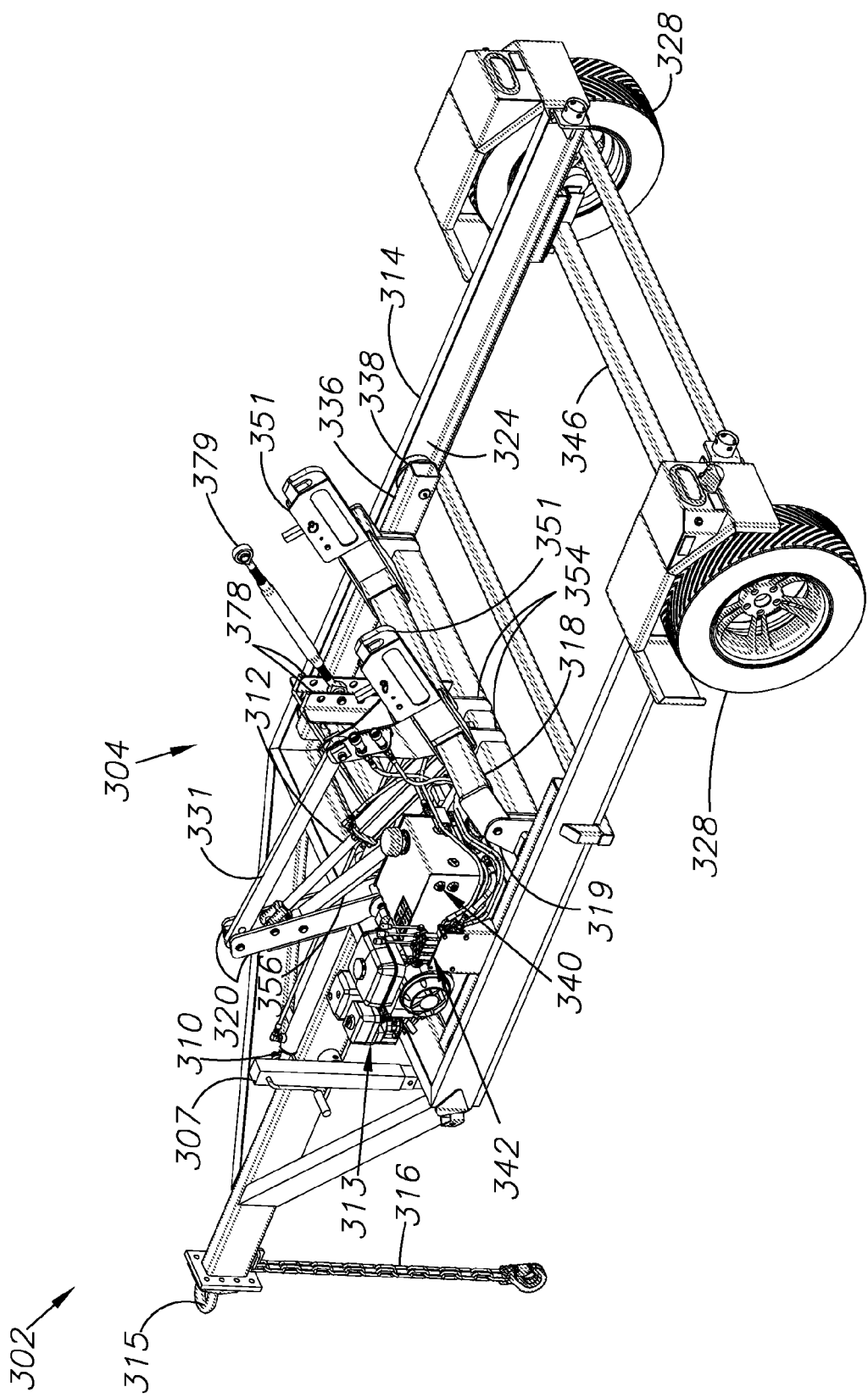
FIG. 23 is an isometric view of yet another alternative embodiment load lift assembly including its typical environment of a trailer, the alternative embodiment load lift assembly being in a first, transport position.
Figure 24:
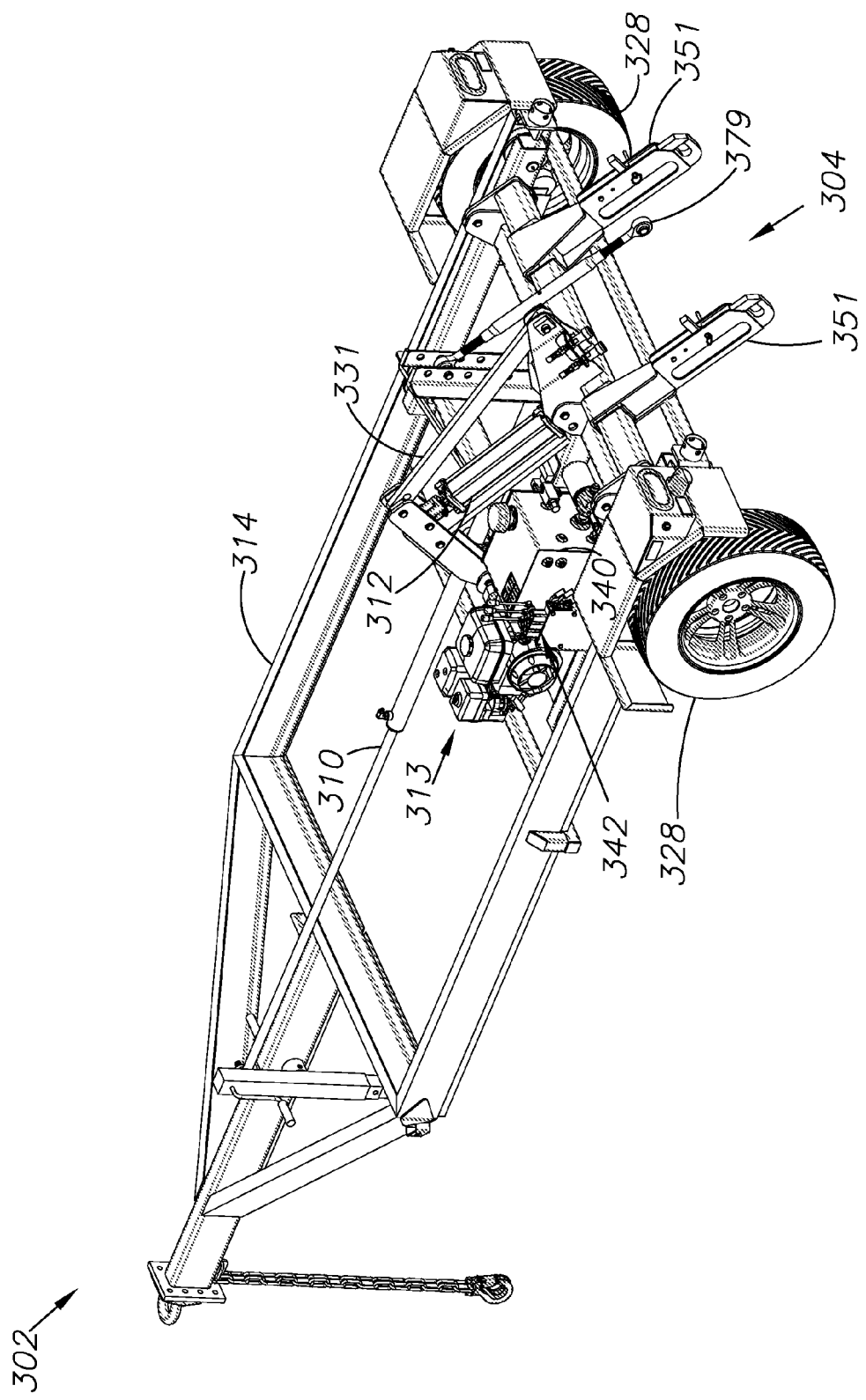
FIG. 24 is an isometric view thereof, the alternative embodiment load lift assembly being in a second, loading position.
Figure 25:
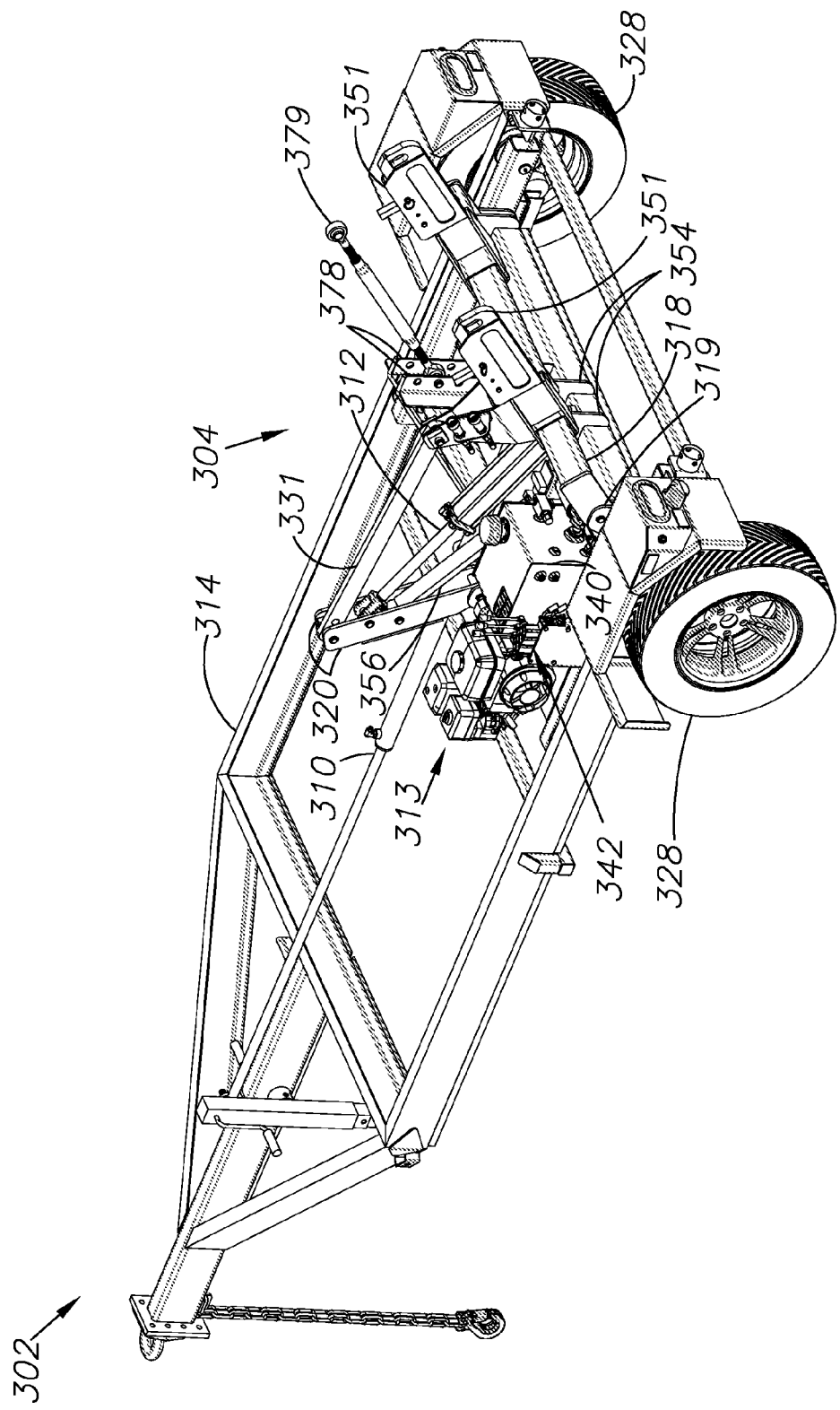
FIG. 25 is an isometric view thereof, the alternative embodiment load lift assembly being in a third, lifting position.
Figure 26:
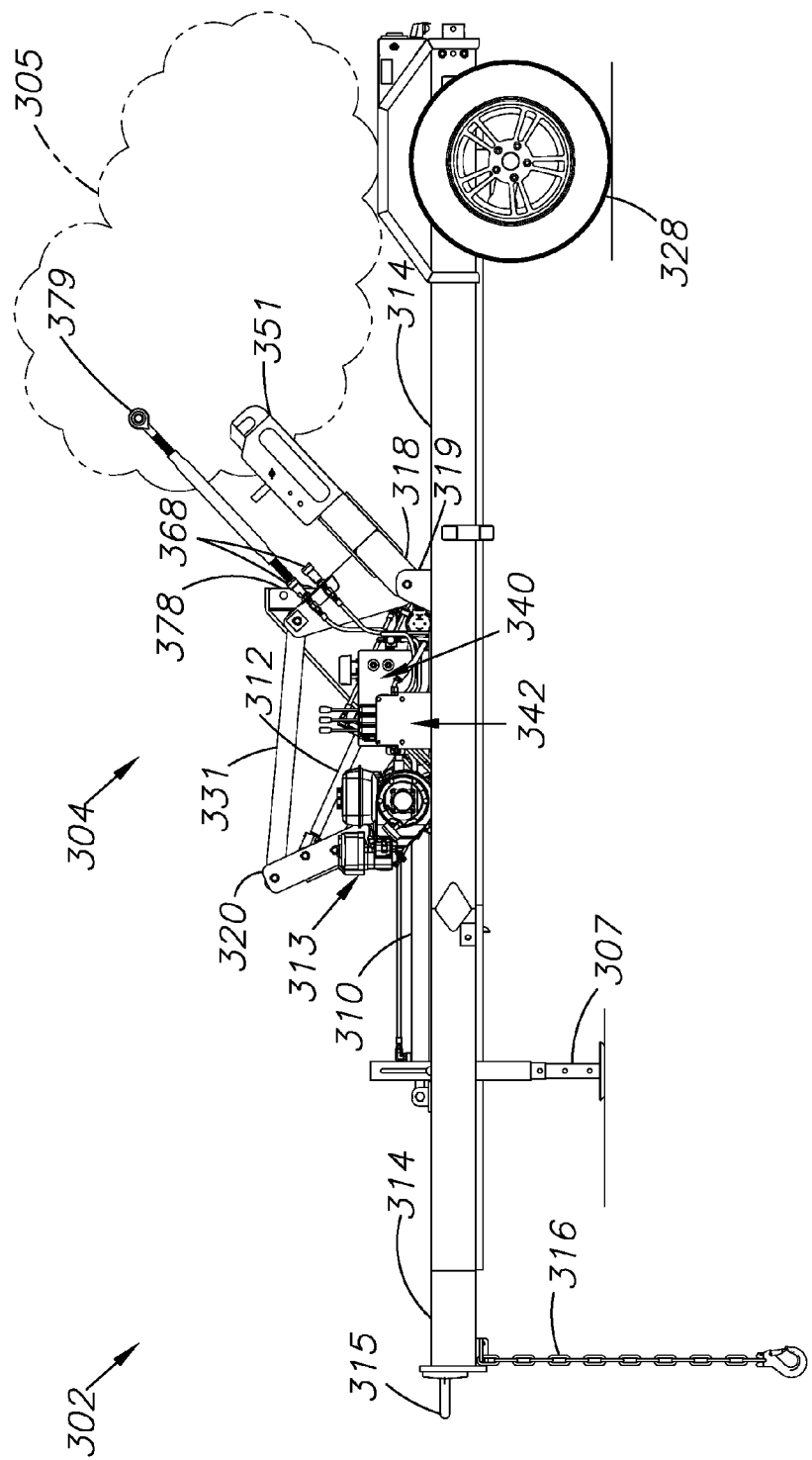
FIG. 26 is a side elevational view of the embodiment shown in FIG. 23.
Figure 27:
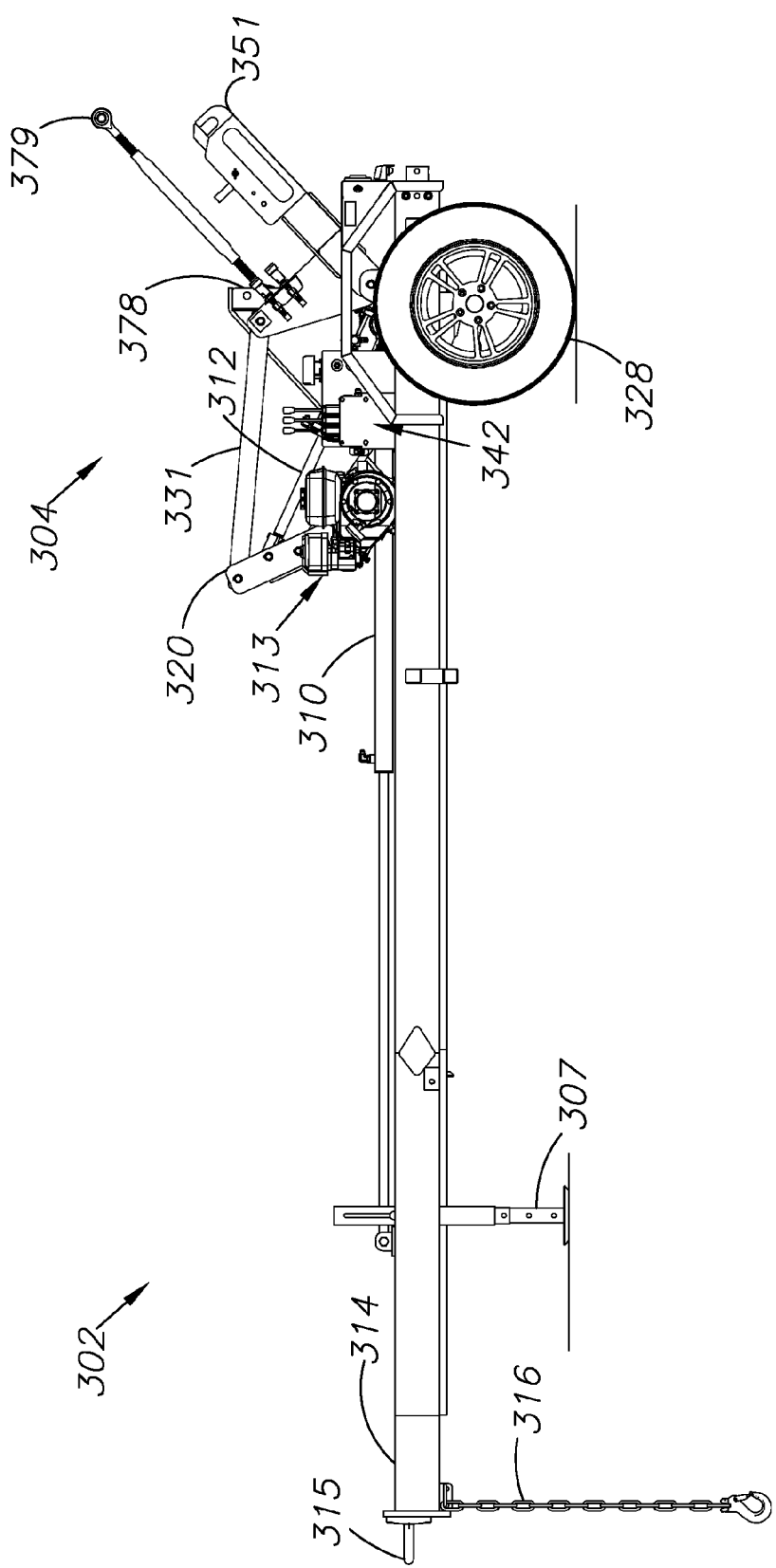
FIG. 27 is a side elevational view of the embodiment shown in FIG. 25.
Figure 28:
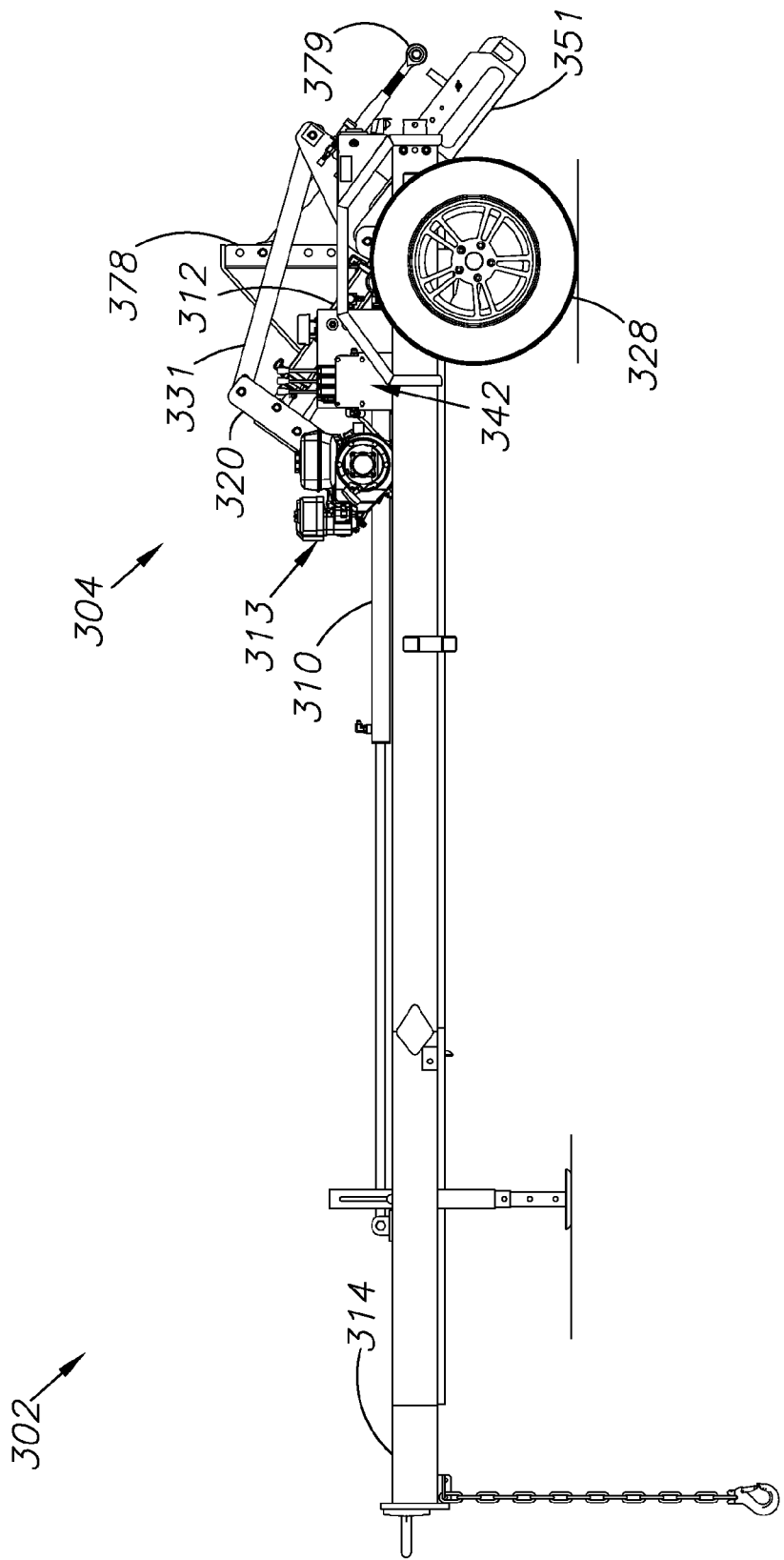
FIG. 28 is a side elevational view of the embodiment shown in FIG. 24.
Figure 29:
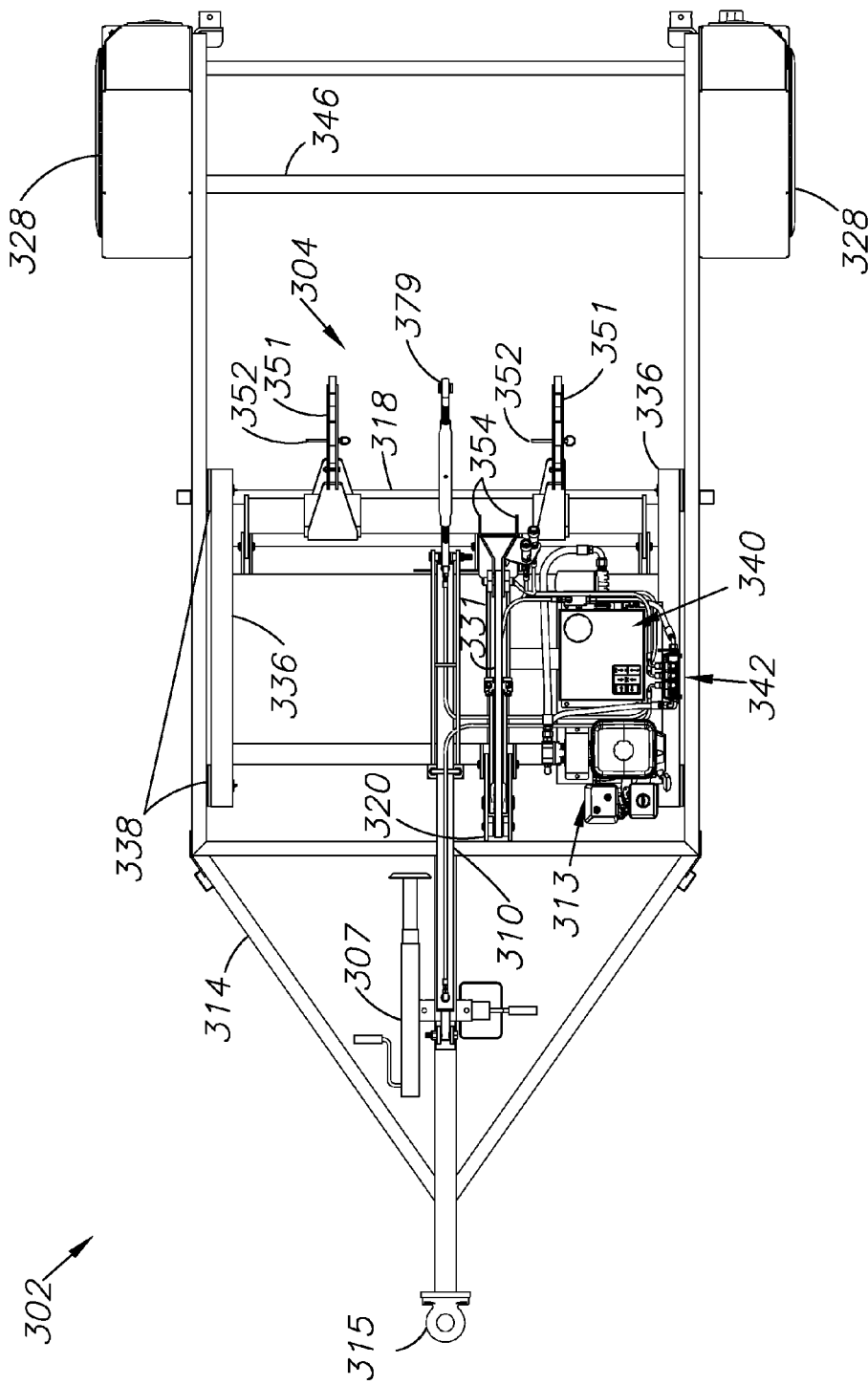
FIG. 29 is a top plan view of the embodiment shown in FIG. 24.
Figure 30:
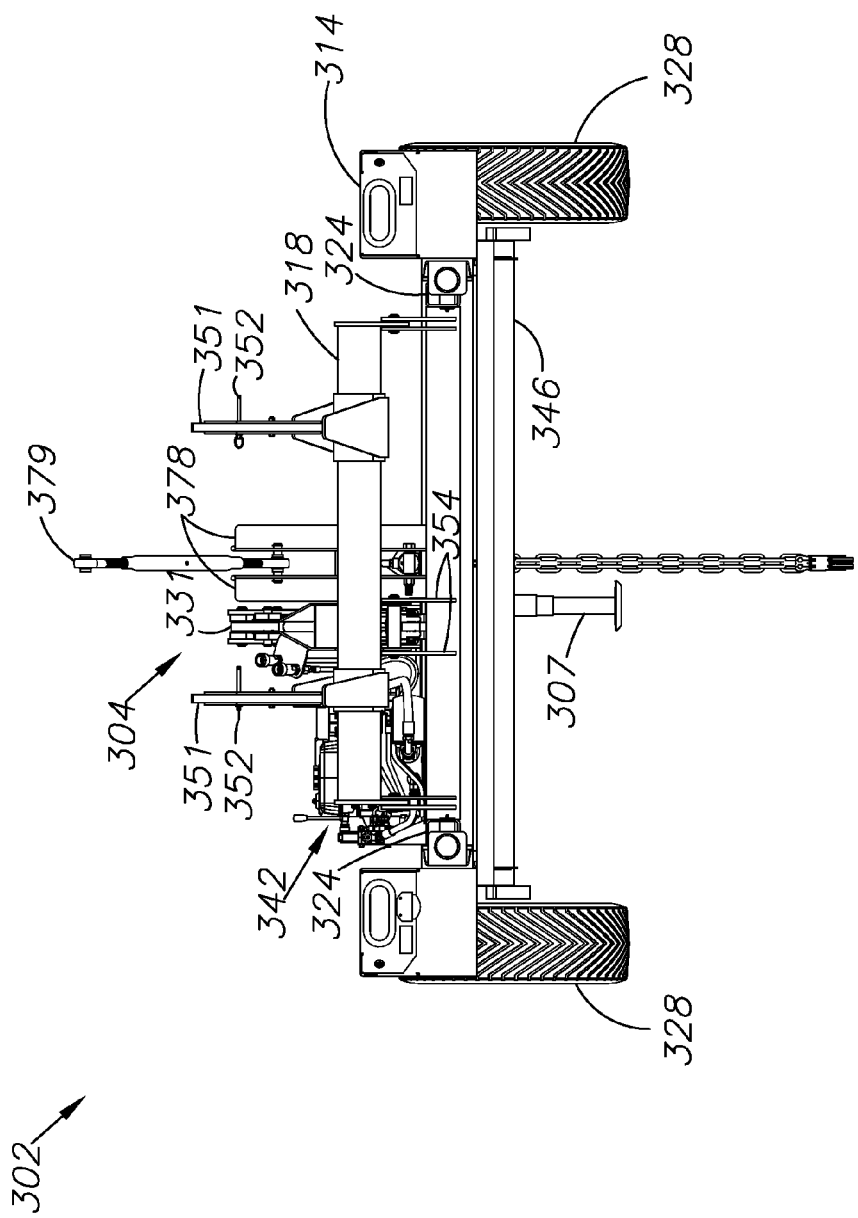
FIG. 30 is a rear elevational view thereof.

As shown in the progression of FIGS. 23-25, the lifting assembly 304 is transferred from a first, transport position as shown in FIG. 23, to a second, loading position as shown in FIG. 24, to a third, lifted position as shown in FIG. 25. Once the implement 305 or other object is lifted, the lifting assembly 304 is transferred back to the transport position as shown in FIG. 23, now with a loaded implement or other object. FIG. 26 demonstrates how an implement 305 would be positioned over the axle assembly 346 and wheels 328 of the trailer when the implement lift system 302 is in the transport position, thereby providing the most stability for the transported implement 305.

The lifting assembly 304 is designed to attach to a three-point hitch of an implement or some other object to be lifted. A pair of lower lift arms 351 pinned to arms of a lift arm weldment 318 with mounting pins 352, the lower lift arms 351 connect to two points of the three-point hitch. The lift arm weldment 318 is mounted to lift arm weldment mounting end brackets 319 and lift arm weldment center brackets 354 affixed to the main frame of the lifting assembly 304. The lift arm weldment 318 and lift arms 351 form the lower linkage assembly 350. A top link assembly 379 connects to the third point of the three-point hitch. The top link assembly 379 is pivotally pinned to a pair of top link mounting brackets 378 which are affixed to the main frame of the lifting assembly 304. The main frame of the lifting assembly is bounded by a pair of carriage weldments 336 which have carriage rollers 338 designed to allow the assembly 304 to slide easily along carriage guides 324 which are part of the trailer frame 314.

The lifting assembly 304 is moved along the carriage guides 324 of the trailer frame 314 by a piston-and-cylinder arm 310 which is powered by a hydraulic reservoir assembly 340 and motor 313. A second piston-and-cylinder arm 312 causes the lower linkage assembly to pivot about the lift arm weldment mounting brackets 319, thereby raising and lowering the arms 351 and any implement attached thereto. A set of controls 342 are connected to the hydraulic system 340 and operate the hydraulics which power hydraulic arms 310, 312. A lift lock weldment 356 stabilizer arm helps to secure the lower linkage assembly 350 in position by being received by a lift lock weldment receiver 358 mounted to the frame of the lifting assembly 304. The lift lock weldment 356 physically prevents the lift arms 351 and lift arm weldment 318 from dropping an attached implement. A lift link 331 also pivotally joins the lift arms 351 and lift arm weldment 318 to a pair of rear lift arm brackets 320 which are pivotally mounted to a pair of rear mounting brackets 322. The end of the lift lock weldment 356 and the piston-and-cylinder arm 312 are also pivotally mounted to the rear lift arm brackets 320. This entire assembly allows all of these elements to freely pivot, allowing the lower linkage assembly 350 to be lifted or lowered.

In operation, the lifting assembly 304 is pushed to the rear of the trailer frame 314 via the hydraulic piston-and-cylinder arm 310. The lower linkage assembly 350 and top link assembly 379 are hydraulically lowered using the other piston-and-cylinder arm 312. The implement 305 is connected to the lower linkage assembly 350 liftarms 351 and the top link assembly 379 via a three-point hitch. The piston-and-cylinder arm 312 then hydraulically raises the lower linkage assembly 350 and top link assembly 379, and the lift lock weldment 356 locks into the lift lock weldment receiver 358, physically restraining the implement from dropping without an operator operating the controls 342 instructing it to be dropped. The entire lifting assembly 304 is then drawn back towards the front of the trailer frame 314, and the implement is stored above the wheels 328 and axle assembly 346 of the trailer for transport. The implement 305 can be unloaded using these same steps.

As indicated in FIGS. 26, 31, and 32, implement connections 368 connect the hydraulic systems of the implement 305 hooked up to the lift assembly 304. The implement 305 may then be controlled using the controls 342 and the hydraulic reservoir assembly 340 of the lift assembly 304. This allows the operator to hydraulically rotate the implement 305 using the implement's own controllable elements in the event that the implement would not fit within standard transportation dimensions for roads and hi-ways. An example may be a bladed implement for earth grading which can be pivoted about a center point once the implement is pulled onto the trailer of the lifting system 302.

FIG. 33 includes a pair of outriggers 308 mounted to the rear of the trailer frame 314. These outriggers 308 stabilize the trailer and the loading system 302 while the implement is being loaded onto the trailer. If, for example, the loading system 302 is deployed in an area with soft ground underneath, the outriggers help to prevent the trailer from tipping while the load is added to the trailer. Here, the outriggers 308 are shown with a hand crank and a wide splayed footing. The hand crank could be replaced with any other mechanical means for raising and lowering the outrigger. When not in use, the outriggers may be rotated for storage or removed entirely from the trailer frame.

It is to be understood that the invention can be embodied in various forms, and is not to be limited to the examples discussed above. The range of components and configurations which can be utilized in the practice of the present invention is virtually unlimited.

The invention claimed is:

1. A system for placing a load on a vehicle including a vehicle frame, which load-placing system comprises:
a load lift assembly having a first, lowered position for connecting to a load, a second, raised position with said load lifted above a level of said vehicle frame, and a third, transport position with said load positioned over and connected to said vehicle frame;
a lift actuator connected to said load lift assembly and configured for moving said load lift assembly between its lowered and raised positions;
a transfer actuator connected to said load lift assembly and configured for moving said load lift assembly between its raised and transport positions axially along said vehicle frame;
said load lift assembly including a lower linkage assembly including a pair of lift arms configured for connecting to two points of said three-point hitch;
said load lift assembly including a top link configured for connecting to a third point of said three-point hitch;
said top link being pivotally pinned to a pair of mounting brackets affixed to said load lift assembly;
a hydraulic reservoir assembly configured to operate said lift actuator and said transfer actuator;
a motor assembly configured to provide power to said hydraulic reservoir assembly;
a control assembly configured to send control signals to said hydraulic reservoir assembly;
a first hydraulic arm connected to a front end of said vehicle frame, said hydraulic arm configured for moving said load lift assembly between said second, raised position in proximity to a rear end of said vehicle frame and said third, transport position in proximity to said front end of said vehicle frame; and
a second hydraulic arm configured to pivot said lower linkage assembly about said lift arm weldment.

2. The load-placing system according to claim 1 wherein said load includes a three-point hitch and said system includes:
said lower linkage assembly including a lift arm weldment, said pair of lift arms affixed to said lift arm weldment; and
said lift arm weldment pivotally engaging at least one mounting bracket affixed to said load lift assembly.

3. The load-placing system of claim 1, which includes:
a pair of carriage guides mounted on said vehicle frame in proximity to a respective side of said vehicle frame;
said carriage including a pair of carriage wheels each rollingly engaging a respective carriage guide; and
said pair of carriage guides configured to guide said load lift assembly longitudinally along said vehicle frame between said first, transport position and said second, raised position.

4. The load-placing system of claim 1, which includes:
a stabilizer arm assembly connected to said frame and adapted for stabilizing said frame while said load is in said raised and transport positions by interlocking with a weldment receiver mounted to said lower linkage assembly; and said stabilizer assembly being movable between a locked position engaging a stabilizer arm receiver, and a disengaged position disengaged from the stabilizer arm receiver.

* * * * *